(12) United States Patent
Liao et al.

(10) Patent No.: US 11,516,325 B2
(45) Date of Patent: Nov. 29, 2022

(54) ELECTRONIC DEVICE

(71) Applicant: Huawei Technologies Co., Ltd., Shenzhen (CN)

(72) Inventors: Yuelong Liao, Shenzhen (CN); Hung-Yi Huang, Shanghai (CN); Qinghao Jin, Shenzhen (CN); Lupeng Yao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 16/982,442

(22) PCT Filed: Feb. 23, 2019

(86) PCT No.: PCT/CN2019/075983
§ 371 (c)(1),
(2) Date: Sep. 18, 2020

(87) PCT Pub. No.: WO2019/179281
PCT Pub. Date: Sep. 26, 2019

(65) Prior Publication Data
US 2021/0058502 A1   Feb. 25, 2021

(30) Foreign Application Priority Data

Mar. 19, 2018 (CN) .......................... 201810224500.1

(51) Int. Cl.
*H04M 1/02* (2006.01)
*G06F 1/16* (2006.01)
*H04N 5/225* (2006.01)

(52) U.S. Cl.
CPC ........ *H04M 1/0268* (2013.01); *G06F 1/1616* (2013.01); *G06F 1/1641* (2013.01);
(Continued)

(58) Field of Classification Search
CPC combination set(s) only.
See application file for complete search history.

(56) References Cited

U.S. PATENT DOCUMENTS

| 6,577,496 B1 | 6/2003 | Gioscia et al. |
| 8,633,867 B2 * | 1/2014 | Kim ..................... G06F 1/1626 345/1.1 |

(Continued)

FOREIGN PATENT DOCUMENTS

| CN | 201234277 Y | 5/2009 |
| CN | 103238146 A | 8/2013 |

(Continued)

*Primary Examiner* — Quochien B Vuong
(74) *Attorney, Agent, or Firm* — Leydig, Voit & Mayer, Ltd.

(57) ABSTRACT

An electronic device is disclosed. The electronic device includes a foldable display including a first display portion and a second display portion, a shaft disposed between the first display portion and the second display portion, and at least one camera disposed in a sub-area of the first display portion. The first display portion and the second display portion are configured to rotate about the shaft with respect to each other to fold or unfold the foldable display. The sub-area of the first display portion has a thickness greater a thickness of the electronic device when the foldable display is folded.

20 Claims, 11 Drawing Sheets

(52) U.S. Cl.
CPC ........ *G06F 1/1686* (2013.01); *H04M 1/0264* (2013.01); *H04N 5/2257* (2013.01); *H04M 2250/16* (2013.01)

(56) References Cited

U.S. PATENT DOCUMENTS

| | | | |
|---|---|---|---|
| 10,416,883 B2* | 9/2019 | Kim | G06F 1/1637 |
| 10,945,346 B2* | 3/2021 | Moon | G06F 1/1618 |
| 2016/0026219 A1 | 1/2016 | Kim et al. | |
| 2016/0070303 A1 | 3/2016 | Lee et al. | |
| 2017/0336826 A1 | 11/2017 | Rolus Borgward | |
| 2019/0166703 A1* | 5/2019 | Kim | H04M 1/0268 |

FOREIGN PATENT DOCUMENTS

| | | | | |
|---|---|---|---|---|
| CN | 103329061 | A | 9/2013 | |
| CN | 104506688 | A | 4/2015 | |
| CN | 105007417 | A | 10/2015 | |
| CN | 105491193 | A | 4/2016 | |
| CN | 105516410 | A | 4/2016 | |
| CN | 105528034 | A | 4/2016 | |
| CN | 105554193 | A | 5/2016 | |
| CN | 105808099 | A | 7/2016 | |
| CN | 106875847 | A | 6/2017 | |
| CN | 107613196 | A | 1/2018 | |
| CN | 107682635 | A | 2/2018 | |
| CN | 107770440 | A | 3/2018 | |
| CN | 108289171 | A | 7/2018 | |
| CN | 108449461 | A | 8/2018 | |
| CN | 108616624 | A | 10/2018 | |
| CN | 109167855 | A | 1/2019 | |
| EP | 2254312 | A1 | 11/2010 | |
| JP | 2007079157 | A | 3/2007 | |
| JP | 2008271106 | A | 11/2008 | |
| JP | 2014078234 | A | 5/2014 | |
| KR | 20140090921 | A * | 7/2014 | ........... G06F 1/1626 |
| WO | 2014080545 | A1 | 5/2014 | |

* cited by examiner

TO FIG. 7B

ELECTRONIC DEVICE

CROSS-REFERENCE TO RELATED APPLICATIONS

This application is a national stage of International Application No. PCT/CN2019/075983, filed on Feb. 23, 2019, which claims priority to Chinese Patent Application No. 201810224500.1, filed on Mar. 19, 2018. Both of the aforementioned applications are hereby incorporated by reference in their entireties.

TECHNICAL FIELD

This application relates to the electronic product field, and in particular, to an electronic device having a foldable display.

BACKGROUND

With continuous evolution and development of an electronic device (for example, a smartphone or a tablet), a screen of the electronic device becomes larger, and the electronic device has more diversified functions.

However, the larger screen of the electronic device also leads to many inconveniences to a user. For example, the electronic device is bulky and not portable.

A solution is to increase a screen-to-body ratio of the electronic device while keeping a volume of the electronic device unchanged. When the screen-to-body ratio of the electronic device is a relatively high, even if the electronic device has a relatively large screen, the electronic device may have a relatively small size. Therefore, it becomes a research focus to achieve a bezel-less screen whose screen-to-body ratio is or is close 100%.

However, due to limitations of some functional devices of an existing electronic device, a screen-to-body ratio of the existing electronic device is relatively low and can hardly meet a user requirement.

Therefore, how to increase a screen-to-body ratio of an electronic device becomes an urgent problem to be resolved.

SUMMARY

This application provides an electronic device. The electronic device may have a relatively high screen-to-body ratio.

According to a first aspect, an electronic device is provided. The electronic device includes a foldable display, a folding rotating shaft, and at least one camera, where the display includes a first display subarea and a second display subarea;

the folding rotating shaft is configured to fold or unfold the first display subarea and the second display subarea;

the at least one camera is disposed on the rear of the first display subarea; and when the first display subarea and the second display subarea are in a folded state, the rear of the first display subarea is opposite to the rear of the second display subarea, and the at least one camera is used as a front-facing camera in the second display subarea.

Specifically, for the electronic device in this embodiment of this application, a camera is disposed on the rear of the display, instead of the front of the display. Because no camera is disposed on the front of the display in this embodiment of this application, the electronic device in this embodiment of this application may have a relatively high screen-to-body ratio to meet a requirement of a user for a bezel-less screen.

Further, the at least one camera can be used as the front-facing camera in the second display subarea. In other words, the at least one camera can support a selfie function using the second display subarea.

Therefore, the electronic device in this embodiment of this application can support the selfie function without a camera disposed on the front of the display. Therefore, the electronic device in this embodiment of this application not only can support the selfie function, but also can have a relatively high screen-to-body ratio to meet the requirement of the user for the bezel-less screen.

It should be understood that, in this embodiment of this application, a first display subarea 211 and a second display subarea 212 are in a folded state (in other words, an included angle between the two display subareas is 360 degrees), and this may also be expressed as that a display 210 is in the folded state or that the electronic device is in the folded state; a first display subarea 211 and a second display subarea 212 are in an unfolded state (an included angle between the two display subareas is 180 degrees), and this may also be expressed as that a display 210 is in the unfolded state or that the electronic device is in the unfolded state; or a first display subarea 211 and a second display subarea 212 are in a half-unfolded state (or a half-folded state) (in other words, an included angle between the two display subareas is greater than 180 degrees and less than 360 degrees), and this may be expressed as that a display 210 is in the half-unfolded state (or the half-folded state) or the electronic device is in the half-unfolded state (or the half-folded state). This embodiment of this application is not limited thereto.

It should be understood that, in this embodiment of this application, the first display subarea may also be referred to as a first display area, and the second display subarea may also be referred to as a second display area. This embodiment of this application is not limited thereto.

In a possible implementation, when the first display subarea and the second display subarea are in an unfolded state, a ratio of an area of an entire display area of the display to an area of a first end face of the electronic device on which the display is located is greater than a first screen-to-body ratio, and the entire display area of the display includes the first display subarea and the second display subarea.

Specifically, the first screen-to-body ratio may be 90%, 95%, 98%, or the like. This embodiment of this application is not limited thereto. In other words, in this embodiment of this application, when the first display subarea and the second display subarea are in the unfolded state, a screen-to-body ratio of the electronic device is greater than the first screen-to-body ratio.

Specifically, in this embodiment of this application, a screen size increases when the electronic device is in the unfolded state. Therefore, the electronic device in this embodiment of this application can meet a requirement of the user for a large screen. Further, four sides of the screen of the electronic device in this embodiment of this application can extend to product appearance edges to the greatest extent. For example, the screen-to-body ratio of the electronic device may be or be close to 100%. Therefore, the electronic device in this embodiment of this application can meet the requirement of the user for the bezel-less screen.

In addition, the display of the electronic device in this embodiment of this application can be folded, so that the electronic device has a relatively small volume, and can be easily carried by the user. Therefore, the electronic device in this embodiment of this application can meet the requirement of the user for the large screen in the unfolded state, and can also be easily carried in the folded state. This can improve user experience.

In a possible implementation, when the first display subarea and the second display subarea are in the folded state, a ratio (namely, the screen-to-body ratio of the electronic device in the folded state) of an area of the first display subarea to an area of a second end face (which may also be referred to as a front side of the electronic device in the folded state) of the electronic device on which the first display subarea is located is greater than a second screen-to-body ratio.

Specifically, the second screen-to-body ratio may be 90%, 95%, 98%, or the like. This embodiment of this application is not limited thereto. In other words, in this embodiment of this application, when the first display subarea and the second display subarea are in the folded state, a screen-to-body ratio of the front of the electronic device is greater than the second screen-to-body ratio. For example, the screen-to-body ratio of the front of the electronic device may be or be close to 100%. Therefore, the electronic device in this embodiment of this application can meet the requirement of the user for the bezel-less screen.

In a possible implementation, the area of the first display subarea is greater than an area of the second display subarea;

when the first display subarea and the second display subarea are in the folded state, the at least one camera is located in a first rear subarea of the first display subarea; and the rear of the first display subarea includes the first rear subarea and a second rear subarea, the first rear subarea includes an area that is on the rear of the first display subarea and that does not overlap the rear of the second display subarea, and the second rear subarea includes an area that is on the rear of the first display subarea and that overlaps the rear of the second display subarea.

Specifically, in this embodiment of this application, the at least one camera is disposed on the rear of the first display subarea. When the display is in the unfolded state, the at least one camera may be used as a rear-facing camera. When the display is in the folded state, the at least one camera is specifically disposed in a non-overlapping area of the two display subareas, namely, the first rear subarea. Therefore, the at least one camera may be used as a rear-facing camera in the first display subarea, or may be used as the front-facing camera in the second display subarea. In other words, the at least one camera in this embodiment of this application may be used as the rear-facing camera, or may be used as the front-facing camera to take a selfie.

In this embodiment of this application, the at least one camera disposed on the rear of the first display subarea may have two uses, that is, may be used as the rear-facing camera or may be used as the front-facing camera. Therefore, in this embodiment of this application, the front-facing camera may not need to be separately disposed. Therefore, in this embodiment of this application, the selfie function can be supported without a camera disposed on the front of the display. Therefore, the electronic device in this embodiment of this application not only can support the selfie function, but also can have a relatively high screen-to-body ratio to meet the requirement of the user for the bezel-less screen.

In a possible implementation, a body thickness that is of the electronic device and that corresponds to the second rear subarea and a body thickness that is of the electronic device and that corresponds to the second display subarea each are a first thickness value; and a body thickness that is of the electronic device and that corresponds to the first rear subarea is a second thickness value, and the second thickness value is greater than or equal to the first thickness value.

For example, if the second thickness value is equal to the first thickness value, the entire electronic device has a same body thickness in the unfolded state. Because the entire electronic device has a same body thickness, in this embodiment of this application, in the unfolded state, four edges of the electronic device have a same thickness, so that the user holds the electronic device relatively comfortably and naturally. Therefore, user experience can be improved.

In a possible implementation, the second thickness value is twice the first thickness value.

In this embodiment of this application, because the second thickness value is twice the first thickness value, when the electronic device is in the folded state in this embodiment of this application, a thickness that is of the electronic device and that corresponds to the overlapping part of the first display subarea and the second display subarea is twice the first thickness value, in other words, is equal to the second thickness value. In other words, in the folded state, an overall thickness of the electronic device does not change, that is, is the second thickness value. Because the entire electronic device has a same body thickness, in this embodiment of this application, in the folded state, the four edges of the electronic device have a same thickness, so that the user holds the electronic device relatively comfortably and naturally. Therefore, user experience can be improved.

In a possible implementation, the first rear subarea includes a first area and a second area, and the at least one camera is disposed in the first area;

a body thickness that is of the electronic device and that corresponds to the second area, a body thickness that is of the electronic device and that corresponds to the second rear subarea, and a body thickness that is of the electronic device and that corresponds to the second display subarea each are a third thickness value; and a body thickness that is of the electronic device and that corresponds to the first area is a fourth thickness value, and the fourth thickness value is greater than or equal to the third thickness value.

For example, in the unfolded state, the first area is an area including one of four corners on the rear of the electronic device. This embodiment of this application is not limited thereto.

For example, the fourth thickness value is greater than the third thickness value. For example, the fourth thickness value is twice the third thickness value. This is not limited in this embodiment of this application. Specifically, when the fourth thickness is greater than the third thickness, in the unfolded state, for the overall body thickness, the thickness corresponding to the first area is greater than a body thickness of the rest part, and the rest part has an equal body thickness. The first area has a relatively small area. Therefore, in the unfolded state, only a small area, namely, the first area in which the at least one camera is disposed, is a protruding part. The part is relatively small, and the protruding part is disposed only in a corner. Therefore, in this embodiment of this application, in the unfolded state, the user can still hold the electronic device comfortably, and user experience can be improved.

In a possible implementation, the display is a flexible display made of a flexible material.

In this case, the display may be a whole. In other words, the first display subarea and the second display subarea cannot be separated, and are a whole. The display may be folded and unfolded under action of the folding rotating shaft.

In a possible implementation, the display is made of an inflexible material. For example, the display may also be a common display, for example, a liquid crystal display (liquid crystal display, LCD), an active-matrix organic light emitting diode (active-matrix organic light emitting diode, AMOLED), or an organic light-emitting diode (organic light-emitting diode, OLED). This embodiment of this application is not limited thereto. In this case, the first display subarea and the second display subarea are two independent displays. Under the action of the folding rotating shaft, the first display subarea and the second display subarea may be folded together or unfolded on a same plane. In the unfolded state, the two independent displays may be combined into one large display, to meet the requirement of the user for the large screen. This embodiment of this application is not limited thereto.

In a possible implementation, the display is configured to vibrate and make a sound.

In other words, the electronic device in this embodiment of this application may support the screen to emit a sound. Therefore, the electronic device in this embodiment of this application may not need to be provided with an earpiece. Because no earpiece needs to be disposed, no room needs to be reserved for an earpiece on the front of the electronic device. Therefore, the display in this embodiment of this application may have a relatively high screen-to-body ratio to meet the requirement of the user for the bezel-less screen.

In a possible implementation, the folding rotating shaft is further configured to enable the first display subarea and the second display subarea to be in a half-unfolded state; and when the first display subarea and the second display subarea are in the half-unfolded state, a first side edge of the first display subarea and a second side edge of the second display subarea are placed on a same plane to support the electronic device, and the first side edge and the second side edge are two separate side edges.

Specifically, in the half-unfolded state, the first display subarea and the second display subarea may support each other, to stand on a same plane (for example, on a dining table, an office table, or an exhibition counter). Usually, an existing electronic device needs to be further provided with a bracket to stand. However, in this embodiment of this application, in the half-unfolded state, the two display subareas may support each other. Therefore, in this embodiment of this application, the electronic device can stand without a separate bracket, and is applicable to a scenario in which the electronic device is used to play a movie, or is used as a calendar, or is used in a working table, or the like. Therefore, user experience can be improved.

In a possible implementation, the electronic device further includes:

a detection module, configured to detect a status of the electronic device, where the status of the electronic device includes a folding status of the first display subarea and a folding status of the second display subarea, and a spatial location relationship between the first display subarea and the second display subarea; and a processing module, configured to control the first display subarea and/or the second display to display a picture based on the status of the electronic device.

Specifically, the folding status may include the folded state, the unfolded state, and the half-unfolded state. The spatial location relationship may include that the first display subarea faces upwards and the second display subarea faces downwards, the first display subarea faces downwards and the second display subarea faces upwards, the first display subarea and the second display subarea face a same direction, or there is an included angle between a direction of the first display subarea and a direction of the second display subarea (in other words, the two display subareas are in the half-unfolded state). A value of the included angle is greater than 180 degrees and less than 360 degrees.

Therefore, in this embodiment of this application, the processing module may automatically determine a display form of the display based on the status that is of the electronic device and that is detected by the detection module, in other words, control one or two displays in the first display subarea and the second display subarea to display a picture. Therefore, the electronic device in this embodiment of this application can determine the display form of the display in a user-friendly manner, and can correspondingly determine a corresponding display form based on an action such as flipping the display of the electronic device by the user. Therefore, user experience can be improved.

It should be understood that the detection module in this embodiment of this application may include a gravity detection apparatus, a folding rotating shaft detection apparatus, and the like. This embodiment of this application is not limited thereto. The gravity detection apparatus may detect the spatial location relationship, and the folding rotating shaft detection apparatus may detect a status of the folding rotating shaft. Further, a folding status of the first display and a folding status of the second display may be detected. This is not limited in this embodiment of this application.

It should be understood that the processing module in this embodiment of this application may be a processor, and the processing module may determine the display form of the electronic device based on the status that is of the electronic device and that is detected by the detection module. This embodiment of this application is not limited thereto.

Optionally, in this embodiment of this application, the processor may include one or more processing units. Preferably, the processor may integrate an application processor and a modem processor. The application processor mainly processes an operating system, a user interface, an application program, and the like. The modem processor mainly processes wireless communication. It may be understood that the modem processor may not be integrated into the processor.

In a possible implementation, the folding status is the folded state, the spatial location relationship is that the first display subarea faces upwards and the second display subarea faces downwards, and the processing module is specifically configured to control the first display subarea to display a picture; and the folding status is the folded state, the spatial location relationship is that the second display subarea faces upwards and the first display subarea faces downwards, and the processing module is specifically configured to control the second display subarea to display a picture.

It should be noted that, in this embodiment of this application, "upwards" represents an upward direction perpendicular to a horizontal plane, and "downwards" represents a downward direction perpendicular to the horizontal plane. It should be noted that in this embodiment of this application, "upwards" and "downwards" may be general concepts. In actual application, when there is an included angle (the included angle is less than 90 degrees) between the direction of the first display subarea and the upward direction perpendicular to the horizontal plane, it may also be referred to as that the first display subarea faces upwards. Similarly, when there is an included angle (the included angle is less than 90 degrees) between the direction of the first display subarea and the downward direction perpendicular to the horizontal plane, it may also be referred to as that the first display subarea faces downwards. This is not limited in this embodiment of this application.

Specifically, in the folded state, one display faces downwards and one display faces upwards, and the user usually cannot view the downward display. Therefore, the processing module may control one display subarea, namely, the upward display, to display a picture. Therefore, in this embodiment of this application, the downward display is prevented from displaying a picture, so that energy consumption of the electronic device can be reduced, and user experience can be improved.

In a possible implementation, the folding status is the unfolded state, and the processing module is specifically configured to control the first display subarea and the second display to display a picture.

Specifically, in the unfolded state, the two display subareas may form a large display. Therefore, the processing module may simultaneously control the two display subareas to display a picture, to meet the requirement of the user for the large screen.

In a possible implementation, the folding status is the half-unfolded state, and the processing module is specifically configured to control the first display subarea and/or the second display to display a picture.

Specifically, in the half-unfolded state, the processing module may control one display subarea to display a picture, or control two display subareas to simultaneously display a picture. This embodiment of this application is not limited thereto.

For example, in an implementation, in the half-unfolded state, the processing module may control the first display subarea to display a picture. Because the area of the first display subarea is greater than the area of the second display subarea, the first display subarea is used to display a picture, for example, display a movie or a web page. Therefore, user experience can be improved.

For another example, in an implementation, in the half-unfolded state, the processing module may control the first display subarea and the second display subarea to simultaneously display a picture.

Specifically, when two users are opposite and the electronic device is placed between the two users, the processing module may control both the two display subareas to display a picture. Therefore, both the two users can view content displayed in respective corresponding display subareas. Therefore, in this embodiment of this application, one machine can be used by two users, and user experience can be improved.

Specifically, in the half-unfolded state, when the processing module controls the first display subarea and the second display subarea to simultaneously display a picture, the two display subareas may display same content. For example, both the two display subareas may display a same movie picture. Optionally, the two display subareas may alternatively display different content. For example, when the two users use different applications, one display subarea displays a picture of one application, and the other display displays a picture of another application. This is not limited in this embodiment of this application. Therefore, in this embodiment of this application, one machine can be used by two users, and user experience can be improved.

DESCRIPTION OF EMBODIMENTS

The following describes technical solutions of this application with reference to accompanying drawings.

Figure 1:
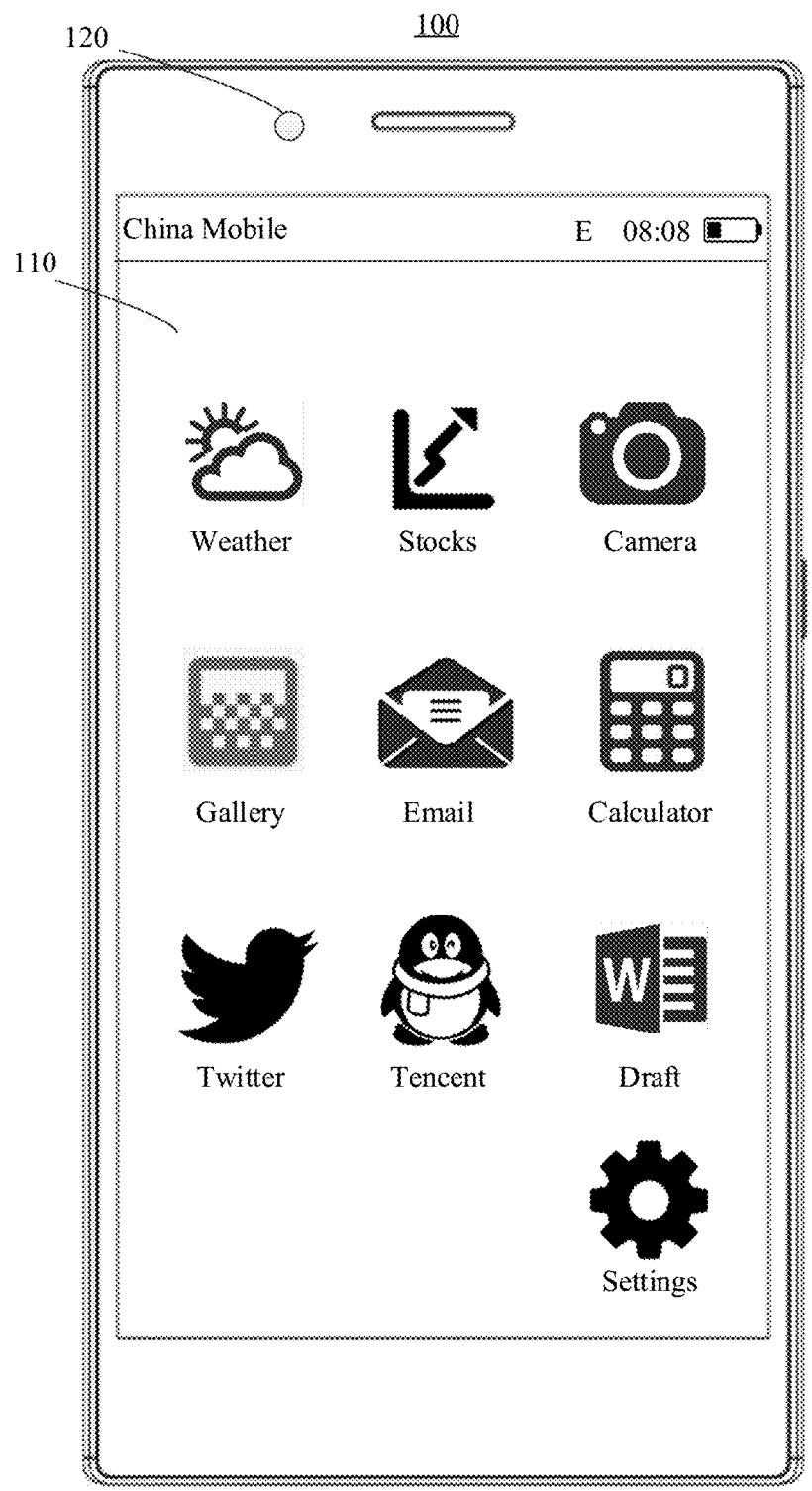
FIG. 1 is a schematic diagram of the front of a mobile phone in the prior art.

FIG. 1 is a schematic diagram of the front of a mobile phone in the prior art. The mobile phone 100 shown in FIG. 1 includes a display 110, a front-facing camera 120, a rear-facing camera (not shown in the figure), and the like. The mobile phone shown in FIG. 1 supports a plurality of application functions. For example, as shown in FIG. 1, applications displayed on the display 110 include Weather, Stocks, Camera, Gallery, Email, Calculator, Twitter, Tencent, Draft, and the like. In addition, the mobile phone 100 further has a settings function, and the like. This embodiment of this application is not limited thereto.

In actual application, a user may use a camera application or another application that can invoke the camera, to implement a selfie function by using the front-facing camera 120. To support the selfie function, the mobile phone 100 shown in FIG. 1 needs to be provided with the front-facing camera 120. Therefore, a screen-to-body ratio of the mobile phone 100 is limited. Consequently, the screen-to-body ratio of the mobile phone 100 is relatively low, and it is difficult to meet a requirement of a user for a bezel-less screen.

In view of the foregoing problem, embodiments of this application provide an electronic device. For the electronic device, a camera is disposed on the rear of the display, instead of the front of the display. Because no camera is disposed on the front of the screen in the embodiments of this application, the electronic device in the embodiments of this application may have a relatively high screen-to-body ratio to meet a requirement of a user for a bezel-less screen.

Further, the display in the embodiments of this application is a foldable display. The display includes a first display subarea and a second display subarea. When the display is in a folded state, the second display subarea is on the rear of the first display subarea through folding, and both the camera and the second display subarea are located on the rear of the first display subarea. In addition, when the first display subarea is a main display area, the camera may be used as a rear-facing camera in the first display subarea; and when the second display subarea is a main display area, the camera can be used as a front-facing camera in the second display subarea. In other words, the camera can support a selfie function using the second display subarea. Therefore, the electronic device in the embodiments of this application can support the selfie function without a camera disposed on the front of the display. Therefore, the electronic device in the embodiments of this application not only can support the selfie function, but also can have a relatively high screen-to-body ratio to meet the requirement of the user for the bezel-less screen.

For ease of understanding and description, by way of example but not limitation, the following describes in detail the electronic device in the embodiments of this application with reference to the accompanying drawings.

It should be understood that the electronic device in the embodiments of this application may include a smartphone, a tablet, (personal digital assistant, PDA personal digital assistant), a computer, a game console, a wearable device, a tablet (portable android device, PAD), and the like. This is not limited in the embodiments of this application.

It should be understood that an operating system running on the electronic device may be a Linux kernel-based operating system such as Android (Android) in a mobile version, a mobile version of Ubuntu (Ubuntu), or Tizen (Tizen), and a desktop operating system such as Windows, Mac OS, or Linux. However, the present invention is not limited thereto.

An example in which the electronic device is a mobile phone is used below to describe the electronic device in the embodiments of this application. However, the embodiments of this application are not limited thereto. When the electronic device is the foregoing another device, reference may be made to the following descriptions of the mobile phone in the embodiments of this application. Examples are not listed one by one for description in this specification.

The following describes in detail the electronic device in the embodiments of this application with reference to FIG. 2 to FIG. 9.

Figure 2:
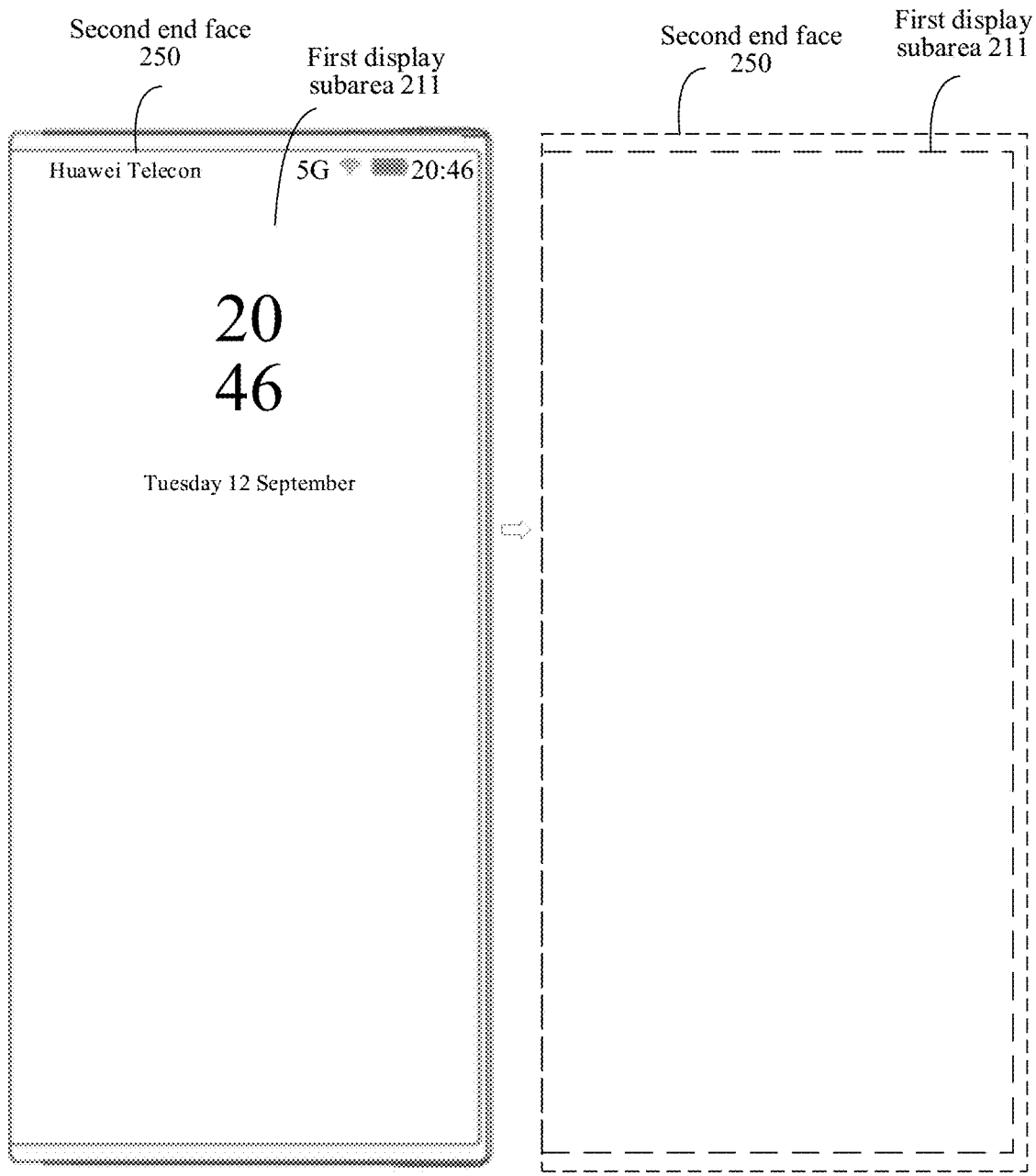
FIG. 2 is a front view of an electronic device in a folded state according to an embodiment of this application.
Figure 3:
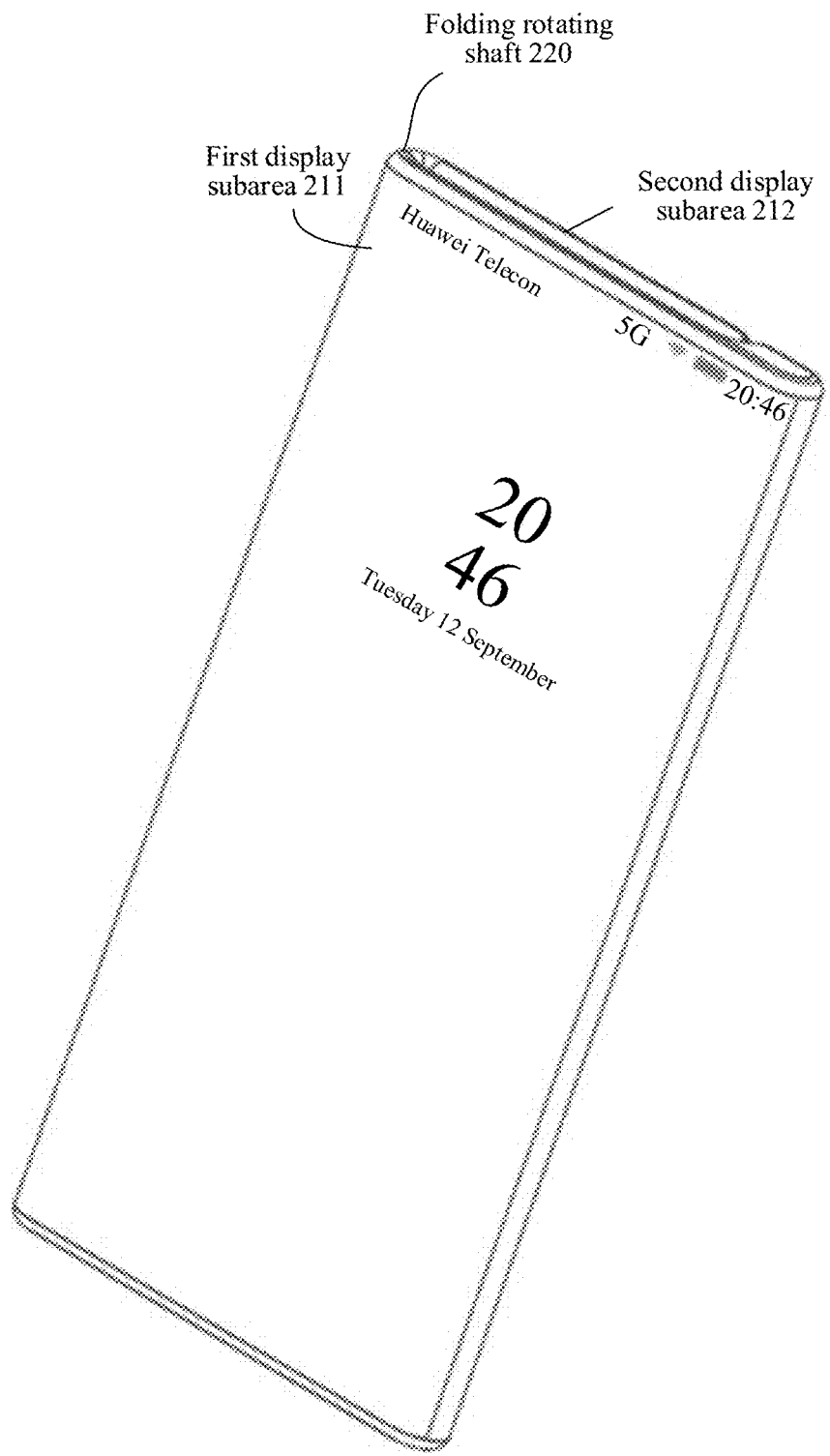
FIG. 3 is a solid figure of an electronic device in a folded state according to an embodiment of this application.
Figure 4:
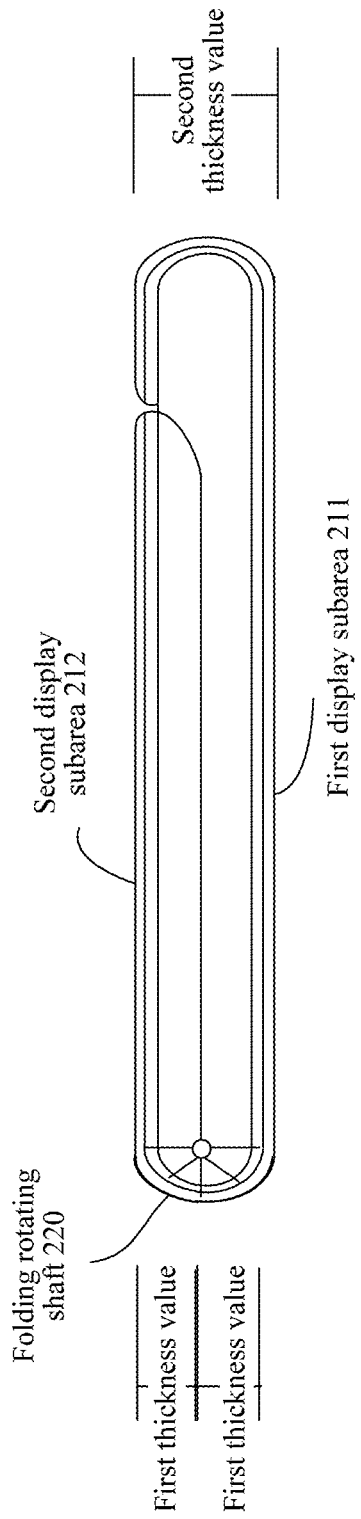
FIG. 4 is a top view of an electronic device in a folded state according to an embodiment of this application.
Figure 5:
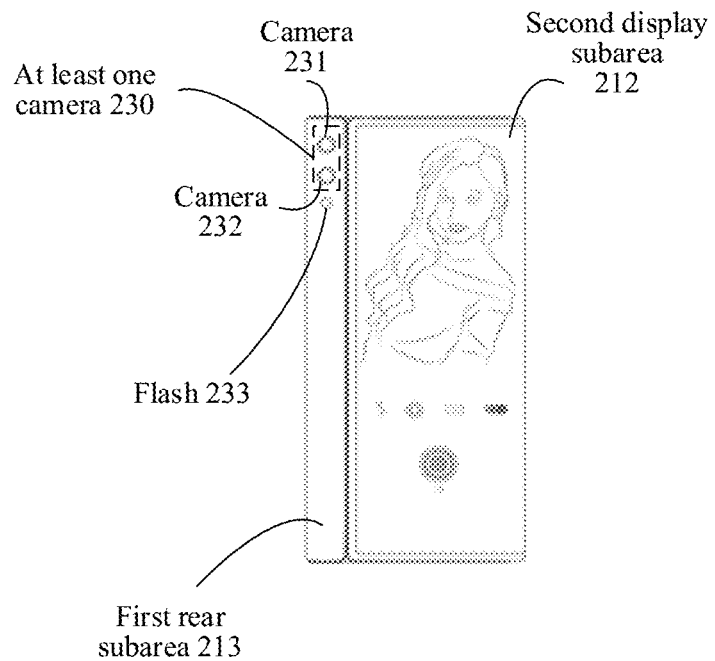
FIG. 5 is a rear view of an electronic device in a folded state according to an embodiment of this application.
Figure 6:
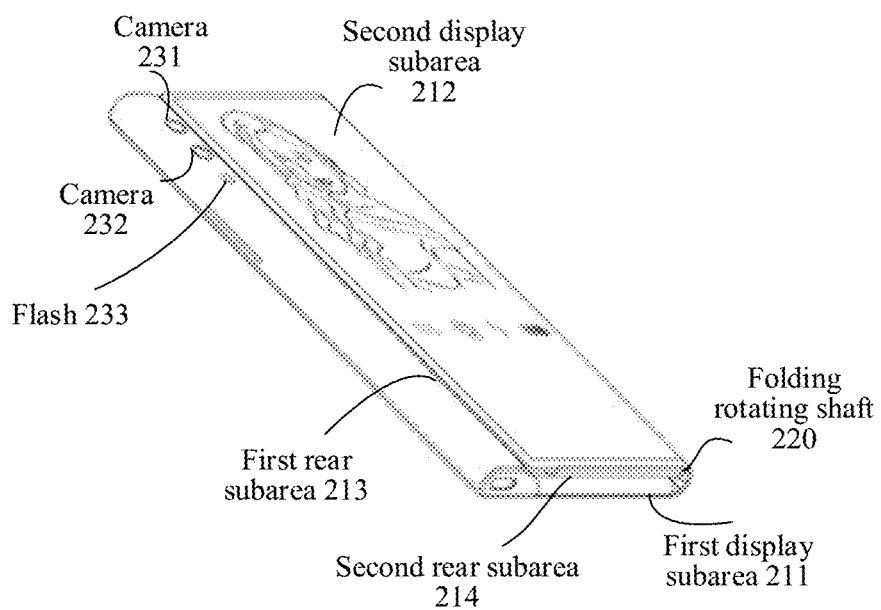
FIG. 6 is a solid figure from the rear of an electronic device in a folded state according to an embodiment of this application.
Figure 7A:
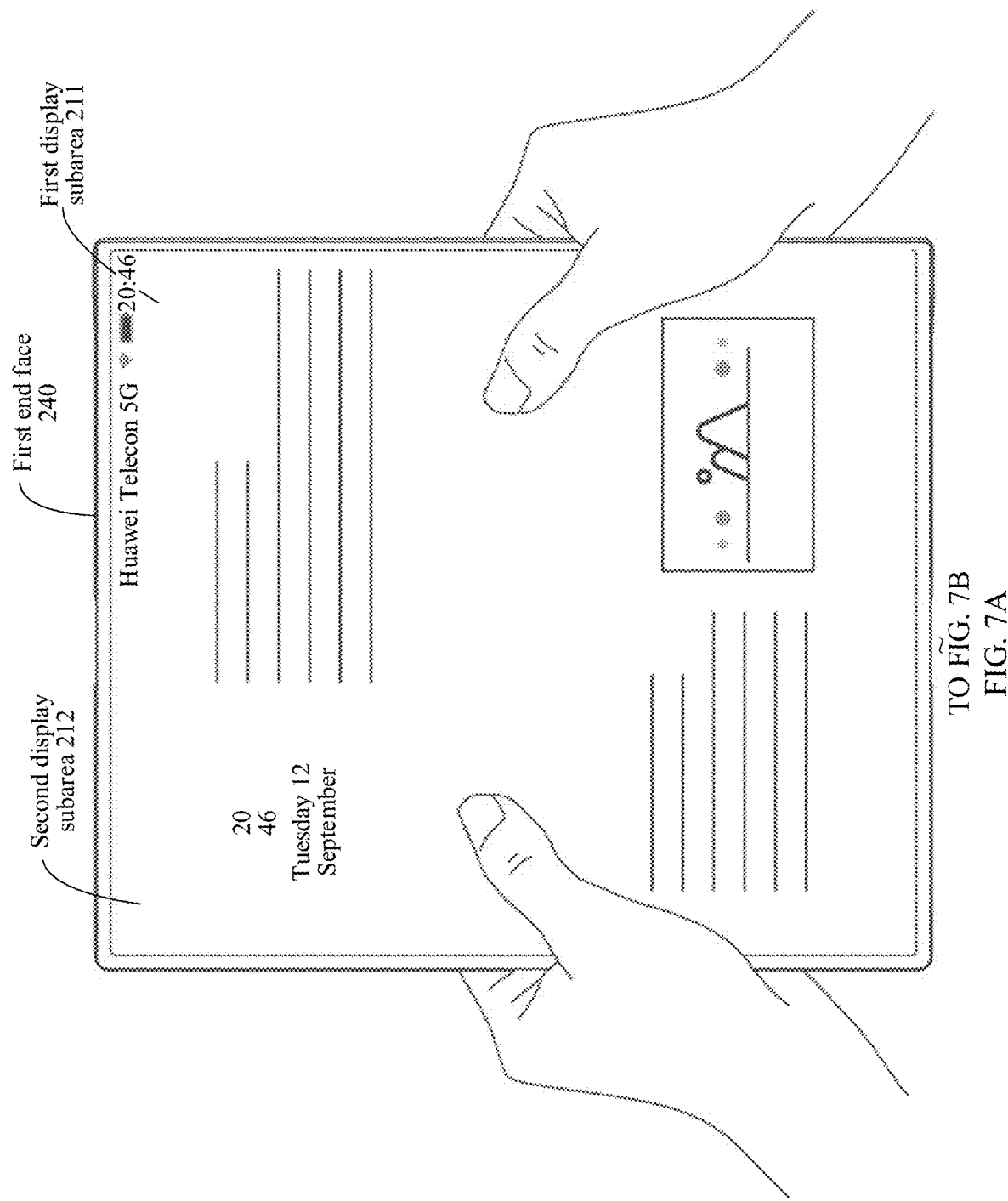
FIG. 7A and FIG. 7B are a front view of an electronic device in an unfolded state according to an embodiment of this application.
Figure 7B:
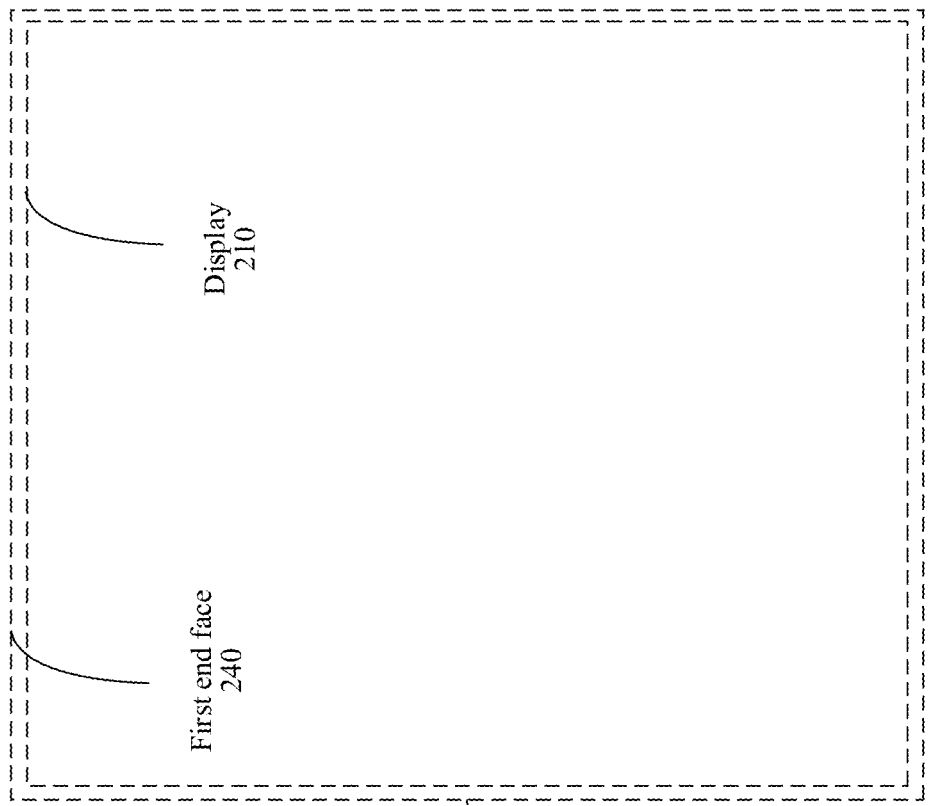
Figure 8:
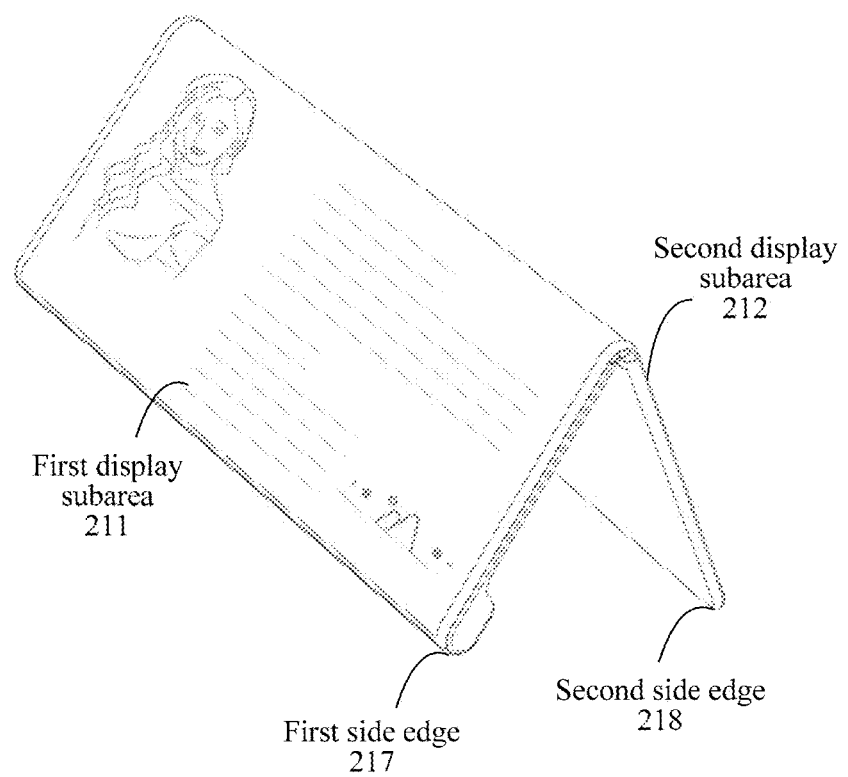
FIG. 8 is a solid figure of an electronic device in a half-unfolded state according to an embodiment of this application.
Figure 9:
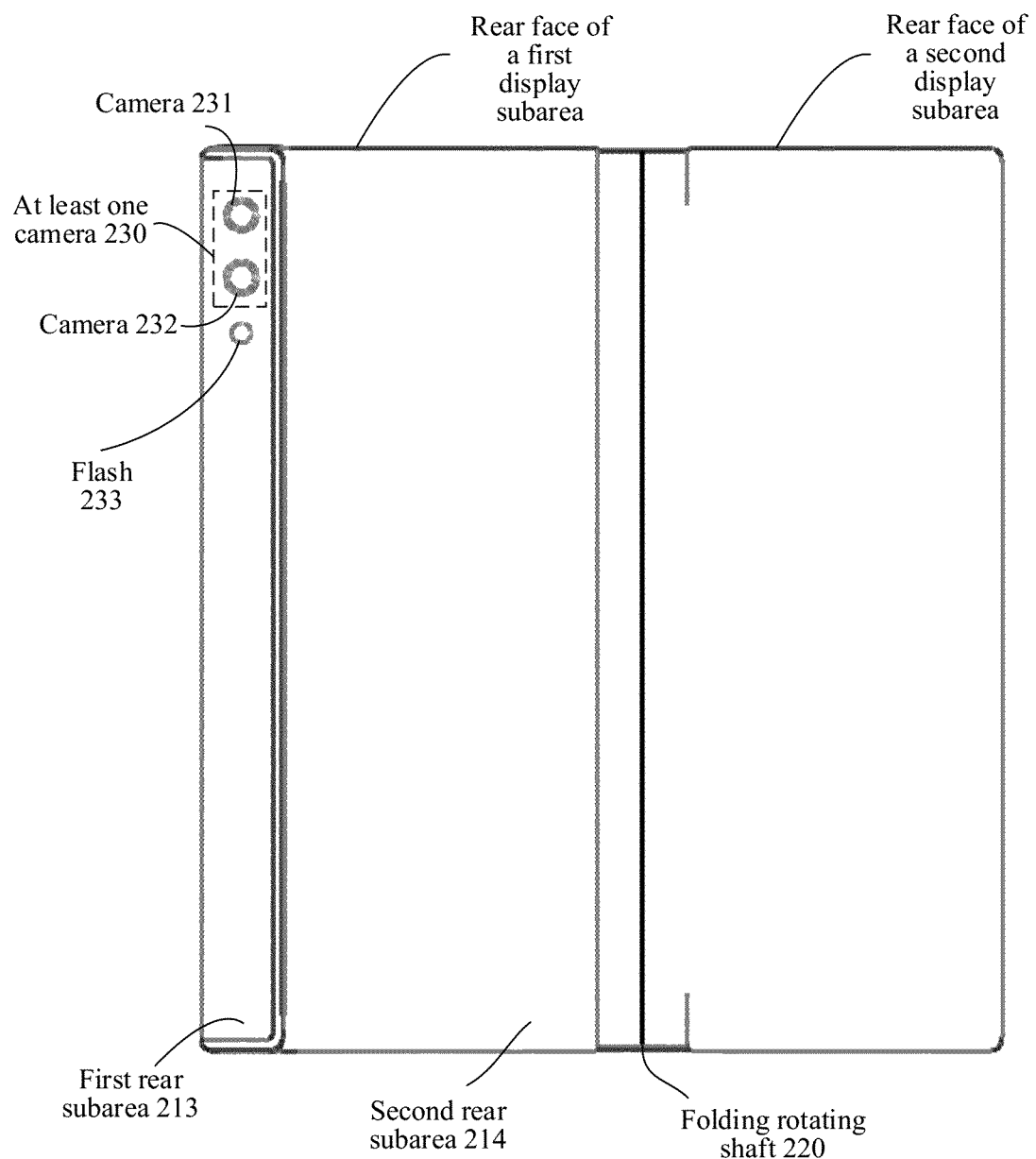
FIG. 9 is a rear view of an electronic device in an unfolded state according to an embodiment of this application.

FIG. 2 is a front view of an electronic device in a folded state according to an embodiment of this application. FIG. 3 is a solid figure of an electronic device in a folded state according to an embodiment of this application. FIG. 4 is a top view of an electronic device in a folded state according to an embodiment of this application. FIG. 5 is a rear view of an electronic device in a folded state according to an embodiment of this application. FIG. 6 is a solid figure from the rear of an electronic device in a folded state according to an embodiment of this application. FIG. 7A and FIG. 7B are a front view of an electronic device in an unfolded state according to an embodiment of this application. FIG. 8 is a solid figure of an electronic device in a half-unfolded state according to an embodiment of this application. FIG. 9 is a rear view of an electronic device in an unfolded state according to an embodiment of this application.

Specifically, as shown in FIG. 2 to FIG. 9, an electronic device 200 in an embodiment of this application may include a foldable display 210, a folding rotating shaft 220, and at least one camera 230.

The display includes a first display subarea 211 and a second display subarea 212.

The folding rotating shaft 220 is configured to fold or unfold the first display subarea 211 and the second display subarea 212.

The at least one camera 230 is disposed on the rear of the first display subarea 211.

When the first display subarea 211 and the second display subarea 212 are in a folded state, the rear of the first display subarea 211 is opposite to the rear of the second display subarea 212, and the at least one camera 230 is used as a front-facing camera in the second display subarea 212.

Specifically, for the electronic device in this embodiment of this application, a camera is disposed on the rear of the display, instead of the front of the display. Because no camera is disposed on the front of the screen in the embodiments of this application, the electronic device in this embodiment of this application may have a relatively high screen-to-body ratio to meet a requirement of a user for a bezel-less screen.

Further, the at least one camera can be used as the front-facing camera in the second display subarea. In other words, the at least one camera can support a selfie function using the second display subarea.

Therefore, the electronic device in this embodiment of this application can support the selfie function without a camera disposed on the front of the display. Therefore, the electronic device in this embodiment of this application not only can support the selfie function, but also can have a relatively high screen-to-body ratio to meet the requirement of the user for the bezel-less screen.

It should be understood that, in this embodiment of this application, the first display subarea 211 and the second display subarea 212 are in the folded state (in other words, an included angle between the two display subareas is 360 degrees), and this may also be expressed as that the display 210 is in the folded state or that the electronic device is in the folded state; the first display subarea 211 and the second display subarea 212 are in an unfolded state (an included angle between the two display subareas is 180 degrees), and this may also be expressed as that the display 210 is in the unfolded state or that the electronic device is in the unfolded state; or the first display subarea 211 and the second display subarea 212 are in a half-unfolded state (or a half-folded state) (in other words, an included angle between the two display subareas is greater than 180 degrees and less than 360 degrees), and this may be expressed as that the display 210 is in the half-unfolded state (or the half-folded state) or that the electronic device is in the half-unfolded state (or the half-folded state). This embodiment of this application is not limited thereto.

It should be understood that, in this embodiment of this application, the first display subarea may also be referred to as a first display area, and the second display subarea may also be referred to as a second display area. This embodiment of this application is not limited thereto.

It should be understood that "first", "second", and the like in this embodiment of this application are merely used for differentiation, and should not be considered as a limitation on this embodiment of this application. In actual application, "first" and "second" may be exchanged. This is not limited in this embodiment of this application.

Optionally, in an embodiment, the display 210 is configured to vibrate and make a sound.

In other words, the electronic device in this embodiment of this application may support the screen to emit a sound. As shown in FIG. 2 to FIG. 9, because the electronic device in this embodiment of this application supports the screen to emit a sound, no earpiece may need to be disposed. Because no earpiece needs to be disposed, no room needs to be reserved for an earpiece on the front of the electronic device. Therefore, the display in this embodiment of this application may have a relatively high screen-to-body ratio to meet the requirement of the user for the bezel-less screen.

It should be understood that FIG. 2 to FIG. 9 show a case in which the electronic device supports the screen to emit a sound and no earpiece is separately disposed. Alternatively, the electronic device may be provided with an earpiece. For example, the earpiece is disposed on the rear of the first display subarea. This is not limited in this embodiment of this application.

Because the earpiece of the electronic device in this embodiment of this application is disposed on the rear of the first display subarea, no room needs to be reserved for an earpiece on the front of the electronic device. Therefore, the display in this embodiment of this application may have a relatively high screen-to-body ratio to meet the requirement of the user for the bezel-less screen. Optionally, in an embodiment, the at least one camera 230 may include one, two, or more cameras. This embodiment of this application is not limited thereto.

For example, as shown in FIG. 5, FIG. 6, and FIG. 9, the at least one camera 230 may include two cameras: a camera 231 and a camera 232.

Optionally, in an embodiment, as shown in FIG. 5, FIG. 6, and FIG. 9, the electronic device 200 may further include a flash 233. This embodiment of this application is not limited thereto.

It should be understood that FIG. 5, FIG. 6, and FIG. 9 show only an example in which the electronic device 200 includes one flash 233. However, this embodiment of this application is not limited thereto. In actual application, the electronic device 200 may include two or more flashes.

Optionally, in an embodiment, as shown in FIG. 7A and FIG. 7B, when the first display subarea 211 and the second display subarea 212 are in the unfolded state, a ratio (a screen-to-body ratio of the electronic device in the unfolded state) of an area of an entire display area of the display 210 to an area of a first end face 240 (which may also be referred to as the front side 240 of the electronic device in the unfolded state) of the electronic device on which the display 210 is located is greater than a first screen-to-body ratio, and the entire display area of the display 210 includes the first display subarea 211 and the second display subarea 212.

It should be understood that, in this embodiment of this application, the first end face 240 may be the front side of the entire electronic device when the electronic device is unfolded. The first end face may also be referred to as a first side or a first front side. This embodiment of this application is not limited thereto. The area of the first end face is shown by a larger rectangle in a lower position in FIG. 7A and FIG. 7B, and the area of the entire display area of the display is shown by a smaller rectangle in the rectangle of the first end face in the lower position in FIG. 7A and FIG. 7B. The ratio of the area of the entire display area of the display 210 to the area of the first end face 240 of the electronic device on which the display 210 is located may also be referred to as the screen-to-body ratio of the electronic device in the unfolded state.

Specifically, the first screen-to-body ratio may be 90%, 95%, 98%, or the like. This embodiment of this application is not limited thereto. In other words, in this embodiment of this application, when the first display subarea 211 and the second display subarea 212 are in the unfolded state, the screen-to-body ratio of the electronic device is greater than the first screen-to-body ratio.

Specifically, in this embodiment of this application, a screen size increases when the electronic device is in the unfolded state. Therefore, the electronic device in this embodiment of this application can meet a requirement of the user for a large screen. Further, four sides of the screen of the electronic device in this embodiment of this application can extend to product appearance edges to the greatest extent. For example, in the unfolded state, the screen-to-body ratio of the electronic device may be or be close to 100%. Therefore, the electronic device in this embodiment of this application can meet the requirement of the user for the bezel-less screen.

In addition, the display of the electronic device in this embodiment of this application can be folded, so that the electronic device has a relatively small volume, and can be easily carried by the user. Therefore, the electronic device in this embodiment of this application can meet the requirement of the user for the large screen in the unfolded state, and can also be easily carried in the folded state. This can improve user experience.

Optionally, in an embodiment, as shown in FIG. 2, when the first display subarea 211 and the second display subarea 212 are in the folded state, a ratio (namely, the screen-to-body ratio of the electronic device in the folded state) of an area of the first display subarea 211 to an area of a second end face 250 (which may also be referred to as the front side 250 of the electronic device in the folded state) of the electronic device on which the first display subarea 211 is located is greater than a second screen-to-body ratio.

It should be understood that, in this embodiment of this application, the second end face 250 may be an end face, on which the first display subarea is located, of the electronic device when the electronic device is folded, and the second end face may also be referred to as a second side or a second front side. This is not limited in this embodiment of this application. The area of the second end face is shown by a larger rectangle on the right in FIG. 2, and the area of the first display subarea is shown by a smaller rectangle in the rectangle of the second end face on the right in FIG. 2. The ratio of the area of the first display subarea 211 to the area of the second end face 250 of the electronic device on which the display 210 is located may also be referred to as a screen-to-body ratio that corresponds to the first display area when the electronic device is in the folded state.

Specifically, the second screen-to-body ratio may be 90%, 95%, 98%, or the like. This embodiment of this application is not limited thereto. In other words, in this embodiment of this application, when the first display subarea 211 and the second display subarea 212 are in the folded state, the screen-to-body ratio that corresponds to the first display subarea of the electronic device is greater than the second screen-to-body ratio. For example, in the folded state, the screen-to-body ratio that corresponds to the first display subarea of the electronic device may be or be close to 100%. Therefore, the electronic device in this embodiment of this application can meet the requirement of the user for the bezel-less screen.

It should be understood that in this embodiment of this application, in the folded state, most of the first display subarea is flat, and a bending position corresponding to the folding rotating shaft is curved. Most of the second end face is also flat, and a position corresponding to the folding rotating shaft is also curved. In other words, the foregoing determined screen-to-body ratio corresponding to the first display subarea is the ratio of the area of the entire first display area (including a curved part and a flat part of the first display area) to an area of the second end face (including a curved part and a flat part).

Alternatively, in another embodiment, the curved part may not be considered when the screen-to-body ratio corresponding to the first display area is calculated in this embodiment of this application. In other words, in the folded state, the screen-to-body ratio corresponding to the first display area is a ratio of an area of the flat part of the first display area to an area of the flat part of the second end face. This is not limited in this embodiment of this application.

In conclusion, it can be learned that in this embodiment of this application, regardless of the unfolded state or the folded state, a screen-to-body ratio corresponding to an end face on which the first display subarea of the electronic device is located is relatively large, for example, may be or be close to 100%. Therefore, regardless of the unfolded state or the folded state, the electronic device in this embodiment of this application can meet the requirement of the user for the bezel-less screen.

Optionally, in an embodiment, the area of the first display subarea 211 is greater than an area of the second display subarea 212.

As shown in FIG. 5 and FIG. 6, when the first display subarea 211 and the second display subarea 212 are in the folded state, the at least one camera 230 is located in a first rear subarea 213 of the first display subarea 211.

The rear of the first display subarea 211 includes the first rear subarea 213 and a second rear subarea 214, the first rear subarea 213 includes an area that is on the rear of the first display subarea 211 and that does not overlap the rear of the second display subarea 212, and the second rear subarea 214 includes an area that is on the rear of the first display subarea 211 and that overlaps the rear of the second display subarea 212.

Specifically, in this embodiment of this application, the at least one camera 230 is disposed on the rear of the first display subarea 211. When the display 210 is in the unfolded state, the at least one camera 230 may be used as a rear-facing camera. When the display 210 is in the folded state, the at least one camera 230 is specifically disposed in a non-overlapping area of the two display subareas, namely, the first rear subarea 213. Therefore, the at least one camera 230 may be used as a rear-facing camera in the first display subarea 211, or may be used as the front-facing camera in the second display subarea 212. In other words, the at least one camera in this embodiment of this application may be used as the rear-facing camera, or may be used as the front-facing camera to take a selfie.

In this embodiment of this application, the at least one camera disposed on the rear of the first display subarea may have two uses, that is, may be used as the rear-facing camera or may be used as the front-facing camera. Therefore, in this embodiment of this application, the front-facing camera may not need to be separately disposed. Therefore, in this embodiment of this application, the selfie function can be supported without a camera disposed on the front of the display.

Therefore, the electronic device in this embodiment of this application not only can support the selfie function, but also can have a relatively high screen-to-body ratio to meet the requirement of the user for the bezel-less screen.

Optionally, in an embodiment, as shown in FIG. 4, a body thickness that is of the electronic device and that corresponds to the second rear subarea 214 and a body thickness that is of the electronic device and that corresponds to the second display subarea 212 each are a first thickness value; and a body thickness that is of the electronic device and that corresponds to the first rear subarea 213 is a second thickness value, and the second thickness value is greater than or equal to the first thickness value.

Specifically, in this embodiment of this application, the body thickness that is of the electronic device and that corresponds to an area in which the at least one camera 230 is disposed, namely, the first rear subarea 213, may be greater than or equal to a body thickness that is of the electronic device and that corresponds to another area.

For example, if the second thickness value is equal to the first thickness value, the entire electronic device has a same body thickness in the unfolded state. Because the entire electronic device has a same body thickness, in this embodiment of this application, in the unfolded state, four edges of the electronic device have a same thickness, so that the user holds the electronic device relatively comfortably and naturally. Therefore, user experience can be improved.

Optionally, in another embodiment, as shown in FIG. 4, the second thickness value is twice the first thickness value.

In this embodiment of this application, because the second thickness value is twice the first thickness value, when the electronic device is in the folded state in this embodiment of this application, a thickness that is of the electronic device and that corresponds to the overlapping part of the first display subarea and the second display subarea is twice the first thickness value, in other words, is equal to the second thickness value. In other words, in the folded state, an overall thickness of the electronic device does not change, that is, is the second thickness value. Because the entire electronic device has a same body thickness, in this embodiment of this application, in the folded state, the four edges of the electronic device have a same thickness, so that the user holds the electronic device relatively comfortably and naturally. Therefore, user experience can be improved.

The foregoing embodiment of this application describes a case in which the body thicknesses corresponding to the second rear subarea 214 and the first display subarea 212 of the electronic device are equal, that is, each are the first thickness value. Alternatively, a body thickness value corresponding to the second rear subarea 214 may not be equal to a body thickness value corresponding to the first display subarea 212. For example, the body thickness value corresponding to the second rear subarea 214 is greater than or less than the body thickness value corresponding to the first display subarea 212. Further, in another embodiment, a sum of the body thickness value corresponding to the second rear subarea 214 and the body thickness value corresponding to the first display subarea 212 is equal to the body thickness value corresponding to the first rear subarea 214.

Because the sum of the body thickness value corresponding to the second rear subarea 214 and the body thickness value corresponding to the first display subarea 212 is equal to the body thickness value corresponding to the first rear subarea 214, in the folded state, the overall thickness of the electronic device does not change, that is, is equal to the body thickness value corresponding to the first rear subarea 214. Because the entire electronic device has a same body thickness, in this embodiment of this application, in the folded state, the four edges of the electronic device have a same thickness, so that the user holds the electronic device relatively comfortably and naturally. Therefore, user experience can be improved.

The foregoing limits a case in which a thickness of the first rear subarea is the second thickness value. Optionally, the first rear subarea may be divided into a first area and a second area, and a body thickness corresponding to the first area may be the same as or different from a body thickness corresponding to the second area.

Specifically, in another embodiment, the first rear subarea 213 includes a first area and a second area, and the at least one camera is disposed in the first area;

a body thickness that is of the electronic device and that corresponds to the second area, a body thickness that is of the electronic device and that corresponds to the first rear subarea 213, and a body thickness that is of the electronic device and that corresponds to the second display subarea 212 each are a third thickness value; and a body thickness that is of the electronic device and that corresponds to the first area is a fourth thickness value, and the fourth thickness value is greater than or equal to the third thickness value.

For example, in the unfolded state, the first area is an area including one of four corners on the rear of the electronic device. This embodiment of this application is not limited thereto.

For example, the fourth thickness value is greater than the third thickness value. For example, the fourth thickness value is twice the third thickness value. This is not limited in this embodiment of this application.

Specifically, when the fourth thickness is greater than the third thickness, in the unfolded state, for the overall body thickness, the thickness corresponding to the first area is greater than a body thickness of the rest part, and the rest part has an equal body thickness. The first area has a relatively small area. Therefore, in the unfolded state, only a small area, namely, the first area in which the at least one camera is disposed, is a protruding part. The part is relatively small, and the protruding part is disposed only in a corner. Therefore, in this embodiment of this application, in the unfolded state, the user can still hold the electronic device comfortably, and user experience can be improved.

Optionally, in an embodiment, as shown in FIG. 8, the folding rotating shaft is configured to enable the first display subarea 211 and the second display subarea 212 to be in a half-unfolded state; and when the first display subarea 211 and the second display subarea 212 are in the half-unfolded state, a first side edge 217 of the first display subarea and a second side edge 218 of the second display subarea are placed on a same plane to support the electronic device, and the first side edge 217 and the second side edge 218 are two separate side edges.

Specifically, as shown in FIG. 8, in the half-unfolded state, the first display subarea 211 and the second display subarea 212 may support each other, to stand on a same plane (for example, on a dining table, an office table, or an exhibition counter). Usually, an existing electronic device needs to be further provided with a bracket to stand. However, in this embodiment of this application, in the half-unfolded state, the two display subareas may support each other. Therefore, in this embodiment of this application, the electronic device can stand without a separate bracket, and is applicable to a scenario in which the electronic device is used to play a movie, or is used as a calendar, or is used in a working table, or the like. Therefore, user experience can be improved.

Optionally, in an embodiment, the display is a flexible display made of a flexible material.

In this case, as shown in FIG. 2 to FIG. 9, the display 210 is a whole. In other words, the electronic device has only one foldable display 210. In other words, the first display subarea 211 and the second display subarea 212 cannot be separated, and are a whole. The display 210 may be folded and unfolded under action of the folding rotating shaft 220.

It should be understood that FIG. 2 to FIG. 9 show a case in which the display of the electronic device is a flexible display. In other words, the display of the electronic device may be bent. However, this embodiment of this application is not limited thereto.

For example, alternatively, in an embodiment, the display may also be a common display, for example, a liquid crystal display (liquid crystal display, LCD), an active-matrix organic light emitting diode (active-matrix organic light emitting diode, AMOLED), or an organic light-emitting diode (organic light-emitting diode, OLED). This embodiment of this application is not limited thereto. In this case, the first display subarea and the second display subarea may be two independent displays. Under the action of the folding rotating shaft, the first display subarea and the second display subarea may be folded together or unfolded on a same plane. In the unfolded state, the two independent displays may be combined into one large display, to meet the requirement of the user for the large screen. This embodiment of this application is not limited thereto.

Optionally, in an embodiment, the electronic device further includes a detection module and a processing module (not shown in the figure).

Specifically, the detection module is configured to detect a status of the electronic device. The status of the electronic device includes a folding status of the first display subarea and a folding status of the second display subarea, and a spatial location relationship between the first display subarea and the second display subarea.

The processing module is configured to control the first display subarea and/or the second display to display a picture based on the status of the electronic device.

Specifically, the folding status may include the folded state, the unfolded state, and the half-unfolded state. The spatial location relationship may include that the first display subarea faces upwards and the second display subarea faces downwards, the first display subarea faces downwards and the second display subarea faces upwards, the first display subarea and the second display subarea face a same direction, or there is an included angle between a direction of the first display subarea and a direction of the second display subarea (in other words, the two display subareas are in the half-unfolded state). A value of the included angle is greater than 180 degrees and less than 360 degrees.

Therefore, in this embodiment of this application, the processing module may automatically determine a display form of the display based on the status that is of the electronic device and that is detected by the detection module, in other words, control one or two displays in the first display subarea and the second display subarea to display a picture. Therefore, the electronic device in this embodiment of this application can determine the display form of the display in a user-friendly manner, and can correspondingly determine a corresponding display form based on an action such as flipping the display of the electronic device by the user. Therefore, user experience can be improved.

It should be understood that the detection module in this embodiment of this application may include a gravity detection apparatus, a folding rotating shaft detection apparatus, and the like. This embodiment of this application is not limited thereto. The gravity detection apparatus may detect the spatial location relationship, and the folding rotating shaft detection apparatus may detect a status of the folding rotating shaft. Further, a folding status of the first display and a folding status of the second display may be detected. This is not limited in this embodiment of this application.

It should be understood that the processing module in this embodiment of this application may be a processor, and the processing module may determine the display form of the electronic device based on the status that is of the electronic device and that is detected by the detection module. This embodiment of this application is not limited thereto.

Optionally, in this embodiment of this application, the processor may include one or more processing units. Preferably, the processor may integrate an application processor and a modem processor. The application processor mainly processes an operating system, a user interface, an application program, and the like. The modem processor mainly processes wireless communication. It may be understood that the modem processor may not be integrated into the processor.

Optionally, in an embodiment, the folding status is the folded state, the spatial location relationship is that the first display subarea faces upwards and the second display subarea faces downwards, and the processing module is specifically configured to control the first display subarea to display a picture.

Optionally, in an embodiment, the folding status is the folded state, the spatial location relationship is that the second display subarea faces upwards and the first display subarea faces downwards, and the processing module is specifically configured to control the second display subarea to display a picture.

It should be noted that, in this embodiment of this application, "upwards" represents an upward direction perpendicular to a horizontal plane, and "downwards" represents a downward direction perpendicular to the horizontal plane. It should be noted that in this embodiment of this application, "downwards" and "downwards" may be general concepts. In actual application, when there is an included angle (the included angle is less than 90 degrees) between the direction of the first display subarea and the upward direction perpendicular to the horizontal plane, it may also be referred to as that the first display subarea faces upwards. Similarly, when there is an included angle (the included angle is less than 90 degrees) between the direction of the first display subarea and the downward direction perpendicular to the horizontal plane, it may also be referred to as that the first display subarea faces downwards. This is not limited in this embodiment of this application.

Specifically, in the folded state, one display faces downwards and one display faces upwards, and the user usually cannot view the downward display. Therefore, the processing module may control one display subarea, namely, the upward display, to display a picture. Therefore, in this embodiment of this application, the downward display is prevented from displaying a picture, so that energy consumption of the electronic device can be reduced, and user experience can be improved.

Optionally, in an embodiment, the folding status is the unfolded state, and the processing module is specifically configured to control the first display subarea and the second display to display a picture.

Specifically, in the unfolded state, the two display subareas may form a large display. Therefore, the processing module may simultaneously control the two display subareas to display a picture, to meet the requirement of the user for the large screen.

The folding status is the half-unfolded state, and the processing module is specifically configured to control the first display subarea and/or the second display to display a picture.

Specifically, in the half-unfolded state, the processing module may control one display subarea to display a picture, or control two display subareas to simultaneously display a picture. This embodiment of this application is not limited thereto.

For example, in an implementation, in the half-unfolded state, the processing module may control the first display subarea to display a picture. Because the area of the first display subarea is greater than the area of the second display subarea, the first display subarea is used to display a picture, for example, display a movie or a web page. Therefore, user experience can be improved.

For another example, in an implementation, in the half-unfolded state, the processing module may control the first display subarea and the second display subarea to simultaneously display a picture.

Specifically, when two users are opposite and the electronic device is placed between the two users, the processing module may control both the two display subareas to display a picture. Therefore, both the two users can view content displayed in respective corresponding display subareas. Therefore, in this embodiment of this application, one machine can be used by two users, and user experience can be improved.

Specifically, in the half-unfolded state, when the processing module controls the first display subarea and the second display subarea to simultaneously display a picture, the two display subareas may display same content. For example, both the two display subareas may display a same movie picture. Optionally, the two display subareas may alternatively display different content. For example, when the two users use different applications, one display subarea displays a picture of one application, and the other display displays a picture of another application. This is not limited in this embodiment of this application. Therefore, in this embodiment of this application, one machine can be used by two users, and user experience can be improved.

It should be understood that the foregoing describes a specific case in which the processing module is configured to control the first display subarea and/or the second display to display a picture based on the status of the electronic device. Optionally, in actual application, the processing module may alternatively select, according to an instruction entered by the user, the first display subarea and/or the second display subarea to display a picture. This embodiment of this application is not limited thereto.

It should be noted that content in the embodiments of the present invention may be combined with each other, and this embodiment of this application is not limited thereto.

It should be noted that the examples in FIG. 2 to FIG. 9 are merely intended to help a person skilled in the art understand the embodiments of the present invention, instead of limiting the embodiments of the present invention to illustrated specific values or specific scenarios in the examples. A person skilled in the art can definitely make various equivalent modifications or changes according to the examples shown in FIG. 2 to FIG. 9, and such modifications or changes also fall within the scope of the embodiments of the present invention.

For example, FIG. 2 to FIG. 9 show a case in which when the display of the electronic device is in the unfolded state and is directly facing a reader of the application document, and the first display subarea does not move, the second display subarea and the first display subarea can be folded together only when the second display subarea on the left is rotated in a clockwise direction. However, this embodiment of this application is not limited thereto. For example, in this embodiment of this application, a reverse direction may also be used. To be specific, when a relatively large display subarea does not move, a relatively small display subarea rotates counterclockwise from a right side to implement the folded state. Correspondingly, in this case, a position of the camera also needs to be correspondingly adjusted.

Figure 10:
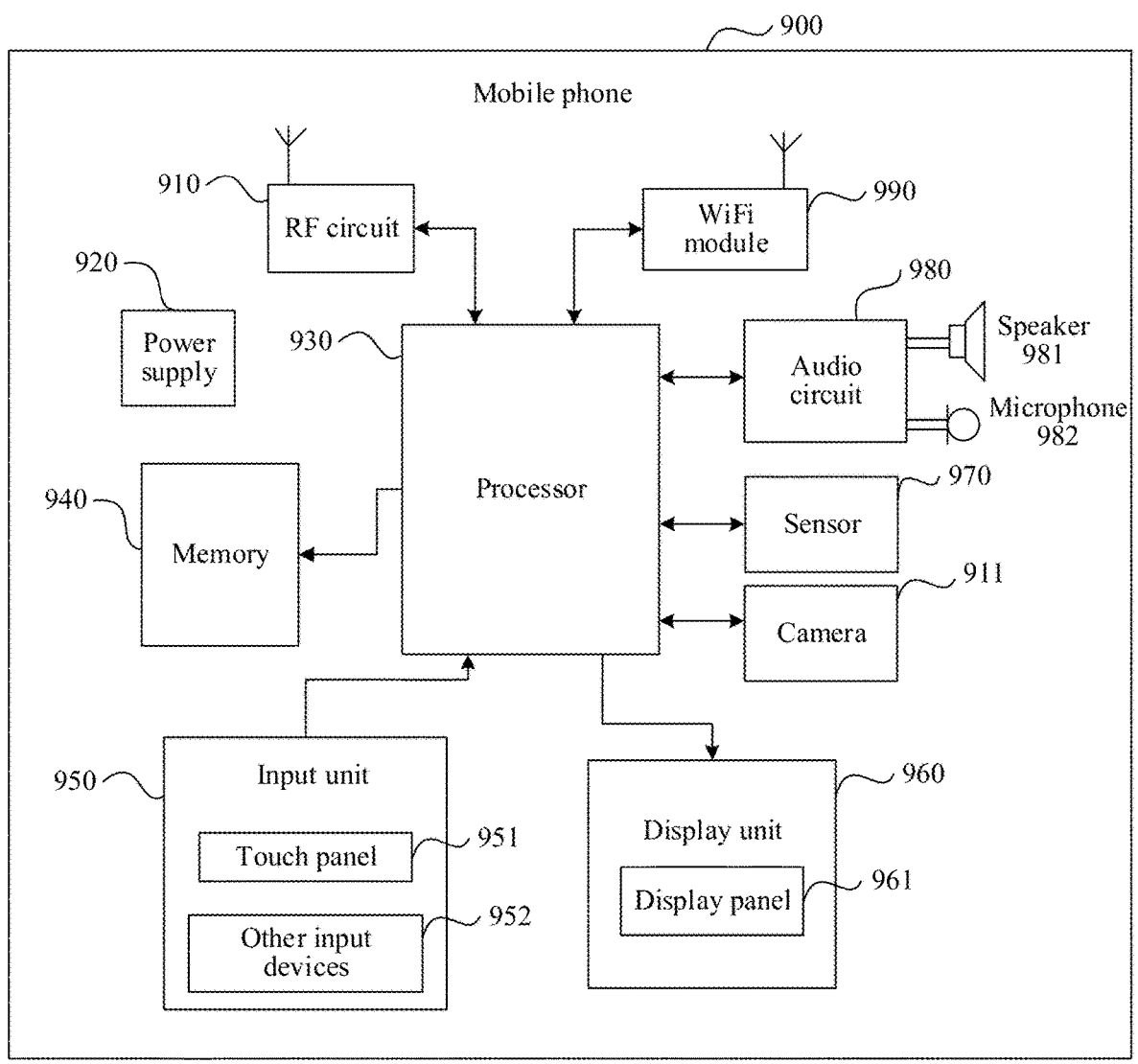
FIG. 10 is a schematic block diagram of a structure of a mobile phone according to an embodiment of this application.

The following describes a structure of a mobile phone in the embodiments of this application by using an example in which the electronic device is a mobile phone. FIG. 10 is a block diagram of a partial structure of a mobile phone 900 according to an embodiment of the present invention. Referring to FIG. 10, the mobile phone 900 includes components such as a radio frequency (Radio Frequency, RF) circuit 910, a power supply 920, a processor 930, a memory 940, an input unit 950, a display unit 960, a sensor 970, an audio circuit 980, a wireless fidelity (wireless fidelity, WiFi) module 990, and at least one camera 911. A person skilled in the art may understand that the structure of the mobile phone shown in FIG. 10 constitutes no limitation on the mobile phone. The mobile phone may include more or fewer components than those shown in the figure, may combine some components, or may have different component arrangements.

The following describes the components of the mobile phone 900 in detail with reference to FIG. 10.

The RF circuit 910 may be configured to receive and send a signal in an information receiving and sending process or a call process. In particular, after receiving downlink information from a base station, the RF circuit 910 sends the downlink information to the processor 930 for processing. In addition, the RF circuit 910 sends uplink data of the mobile phone to the base station. Usually, the RF circuit includes but is not limited to an antenna, at least one amplifier, a transceiver, a coupler, a low noise amplifier (Low Noise Amplifier, LNA), a duplexer, and the like. In addition, the RF circuit 910 may further communicate with a network and another device through wireless communication. Any communications standard or protocol may be used for the wireless communication, including but not limited to global system for mobile communications (GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, short message service (SMS), and the like.

The memory 940 may be configured to store a software program and a module. By running the software program and the module stored in the memory 940, the processor 930 executes various function applications and data processing of the mobile phone 900. The memory 940 may mainly include a program storage area and a data storage area. The program storage area may store an operating system, an application program required for at least one function (such as a sound playback function or an image playback function), and the like. The data storage area may store data (such as audio data or a phone book) created according to use of the mobile phone 900, and the like. In addition, the memory 940 may include a high-speed random access memory, or may include a nonvolatile memory, such as at least one magnetic disk storage device, a flash storage device, or another volatile solid-state storage device.

The input unit 950 may be configured to: receive entered digit or character information, and generate key signal input related to user setting and function control of the mobile phone 900. Specifically, the input unit 950 may include a touch panel 951 and other input devices 952. The touch panel 951, also referred to as a touchscreen, may collect a touch operation (for example, an operation performed by a user on the touch panel 951 or near the touch panel 951 by using any proper object or accessory such as a finger or a stylus) performed by the user on or near the touch panel 951, and drive a corresponding connection apparatus based on a preset program. Optionally, the touch panel 951 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 930, and can receive and execute a command sent by the processor 930. In addition, the touch panel 951 may be implemented in a plurality of types, such as a resistive type, a capacitive type, an infrared type, and a surface acoustic wave type. The input unit 950 may include other input devices 952 in addition to the touch panel 951. Specifically, the other input devices 952 may include but are not limited to one or more of a physical keyboard, a function key (for example, a volume control key or an on/off key), a trackball, a mouse, a joystick, and the like.

The display unit 960 may be configured to display information entered by the user or information provided for the user and various menus of the mobile phone 900. The display unit 960 may include a display panel 961. Optionally, the display panel 961 may be configured in a form of an LCD, an OLED, or the like. Further, the touch panel 951 may cover the display panel 961. When detecting a touch operation on or near the touch panel 951, the touch panel 951 transmits the touch operation to the processor 930 to determine a type of a touch event, and then the processor 930 provides a corresponding visual output on the display panel 961 based on the type of the touch event. In FIG. 10, the touch panel 951 and the display panel 961 are used as two independent components to implement input and input functions of the mobile phone 900. However, in some embodiments, the touch panel 951 and the display panel 961 may be integrated to implement the input and output functions of the mobile phone 900.

It should be understood that, in a possible implementation, the touch panel 951 and the display panel 961 in this embodiment of this application are foldable. For example, the touch panel 951 and the display panel 961 are made of a flexible material. In this embodiment of this application, the touch panel and the display panel may be collectively referred to as a display. This embodiment of this application is not limited thereto. The display may include a first display subarea and a second display subarea. Optionally, the mobile phone in this embodiment of this application may further include a folding rotating shaft (not shown in the figure), and the folding rotating shaft is configured to fold or unfold the first display subarea and the second display subarea.

The mobile phone 900 may further include at least one sensor 970, for example, a light sensor, a motion sensor, and another sensor, for example, an accelerometer sensor (which may also be referred to as a gravity detection apparatus) and a folding rotating shaft sensor (which may also be referred to as a folding rotating shaft detection apparatus). Specifically, the light sensor may include an ambient light sensor and a proximity sensor. The ambient light sensor may adjust luminance of the display panel 961 based on brightness of ambient light, and when the mobile phone 900 approaches an ear, the proximity sensor may turn off the display panel 961 and/or backlight. As one type of motion sensor, the accelerometer sensor (which may also be referred to as a gravity sensor) may detect magnitudes of acceleration in different directions (usually three axes), may detect magnitude and a direction of gravity in a static state, or may be used in an application for identifying a mobile phone posture (such as switching between a horizontal screen and a vertical screen, a spatial location relationship between two display subareas, a related game, and magnetometer posture calibration), a function related to vibration identification (such as a pedometer or a knock), or the like. The folding rotating shaft detection apparatus may detect a status of the folding rotating shaft, and further detect a folding status of the first display and a folding status of the second display. This embodiment of this application is not limited thereto. Other sensors such as a gyroscope, a barometer, a hygrometer, a thermometer, and an infrared sensor may be configured in the mobile phone 900, and details are not described herein.

The audio circuit 980, a speaker 981, and a microphone 982 may provide an audio interface between the user and the mobile phone 900. The audio circuit 980 may convert received audio data into an electrical signal and then transmit the electrical signal to the speaker 981, and the speaker 981 converts the electrical signal into an audio signal for outputting. In addition, the microphone 982 converts a captured audio signal into an electrical signal, and the audio circuit 980 receives the electrical signal and converts the electrical signal into audio data and then outputs the audio data to the RF circuit 910; and then the audio data is transmitted to another mobile phone, or the audio data is output to the memory 940 for further processing. In a possible implementation, functions of components such as the speaker 981 and the microphone 982 may be integrated into another component, to save hardware space, and/or increase a screen-to-body ratio of a bezel-less screen.

WiFi is a short-range wireless transmission technology. By using the Wi-Fi module 990, the mobile phone 900 may help the user send and receive an email, browse a web page, access streaming media, and the like. The WiFi module 990 provides wireless access to the broadband internet for the user. Although FIG. 1 shows the WiFi module 990, it may be understood that the WiFi module 190 is not a necessary part of the mobile phone 900, and may be omitted according to a need without changing the essence of the present invention.

The at least one camera 911 may be disposed on the rear of the first display subarea. When the first display subarea and the second display subarea are in a folded state, the rear of the first display subarea is opposite to the rear of the second display subarea, and the at least one camera is used as a front-facing camera in the second display subarea.

The processor 930 is a control center of the mobile phone 900, is connected to various parts of the entire mobile phone by using various interfaces and lines, and executes various functions of the mobile phone 900 and performs data processing by running or executing the software program and/or the module stored in the memory 940 and invoking data stored in the memory 940, so as to implement various mobile phone-based services. For example, the processor 930 may control the first display subarea and/or the second display to display a picture based on a status that is of the electronic device and that is detected by a detection module, for example, the gravity detection apparatus and the folding rotating shaft detection apparatus. Optionally, the processor 930 may include one or more processing units. Preferably, an application processor and a modem processor may be integrated into the processor 930. The application processor mainly processes an operating system, a user interface, an application program, and the like. The modem processor mainly processes wireless communication. It may be understood that the modem processor may not be integrated into the processor 930.

The mobile phone 900 further includes the power supply 920 (such as a battery) that supplies power to each component. Preferably, the power supply may be logically connected to the processor 930 by using a power supply management system, thereby implementing functions such as charging management, discharging management, and power consumption management by using the power supply management system.

A Bluetooth module and the like, although not shown, may further be included in the mobile phone 900, and details are not described herein again.

The following describes a display method applied to an electronic device in an embodiment of this application. The electronic device is any electronic device in the foregoing embodiments of this application. Specifically, the method may be performed by a processing module of the electronic device. It should be understood that a picture displayed by the electronic device may be a picture of an application, or may be a picture taken by the at least one camera. When the picture taken by the at least one camera is displayed by using the second display subarea, this case may correspond to a selfie scenario of a user. This is not limited in this embodiment of this application. Specifically, the method includes the following steps:

detecting a status of the electronic device, where the status of the electronic device includes a folding status of the first display subarea and a folding status of the second display subarea, and a spatial location relationship between the first display subarea and the second display subarea; and controlling the first display subarea and/or the second display to display a picture based on the status of the electronic device.

Specifically, the folding status may include the folded state, an unfolded state, and a half-unfolded state. The spatial location relationship may include that the first display subarea faces upwards and the second display subarea faces downwards, the first display subarea faces downwards and the second display subarea faces upwards, the first display subarea and the second display subarea face a same direction, or there is an included angle between a direction of the first display subarea and a direction of the second display subarea (in other words, the two display subareas are in the half-unfolded state). A value of the included angle is greater than 180 degrees and less than 360 degrees.

Specifically, the processing module may obtain a status that is of the electronic device and that is detected by a detection module, and automatically determine a display form of the display based on the status of the electronic device, in other words, control one or two displays in the first display subarea and the second display subarea to display a picture. Therefore, the electronic device in this embodiment of this application can determine the display form of the display in a user-friendly manner, and can correspondingly determine a corresponding display form based on an action such as flipping the display of the electronic device by the user. Therefore, user experience can be improved.

It should be understood that, for descriptions of the detection module and the processing module, refer to the foregoing descriptions. Details are not described herein again.

Optionally, in an embodiment, the folding status is the folded state, the spatial location relationship is that the first display subarea faces upwards and the second display subarea faces downwards, and the controlling the first display subarea and/or the second display to display a picture based on the status of the electronic device includes:

controlling the first display subarea to display a picture based on the status of the electronic device.

Alternatively, in an embodiment, the folding status is the folded state, the spatial location relationship is that the second display subarea faces upwards and the first display subarea faces downwards, and the controlling the first display subarea and/or the second display to display a picture based on the status of the electronic device includes:

controlling the second display subarea to display a picture based on the status of the electronic device.

It should be noted that, in this embodiment of this application, "upwards" represents an upward direction perpendicular to a horizontal plane, and "downwards" represents a downward direction perpendicular to the horizontal plane. It should be noted that in this embodiment of this application, "downwards" and "downwards" may be general concepts. In actual application, when there is an included angle (the included angle is less than 90 degrees) between a direction of the first display subarea and the upward direction perpendicular to the horizontal plane, it may also be referred to as that the first display subarea faces upwards. Similarly, when there is an included angle (the included angle is less than 90 degrees) between the direction of the first display subarea and the downward direction perpendicular to the horizontal plane, it may also be referred to as that the first display subarea faces downwards. This is not limited in this embodiment of this application.

Specifically, in the folded state, one display faces downwards and one display faces upwards, and the user usually cannot view the downward display. Therefore, the processing module may control one display subarea, namely, the upward display, to display a picture. Therefore, in this embodiment of this application, the downward display is prevented from displaying a picture, so that energy consumption of the electronic device can be reduced, and user experience can be improved.

Alternatively, in an embodiment, the folding status is the folded state, and the controlling the first display subarea and/or the second display to display a picture based on the status of the electronic device includes:

controlling the first display subarea and the second display to display a picture based on the status of the electronic device.

Specifically, in the unfolded state, the two display subareas may form a large display. Therefore, the processing module may simultaneously control the two display subareas to display a picture, to meet a requirement of the user for a large screen.

Alternatively, in an embodiment, the folding status is the half-unfolded state. Specifically, in the half-unfolded state, the processing module may control one display subarea to display a picture, or control two display subareas to simultaneously display a picture. This embodiment of this application is not limited thereto.

For example, in an implementation, in the half-unfolded state, the controlling the first display subarea and/or the second display to display a picture based on the status of the electronic device includes:

controlling the first display subarea to display a picture based on the status of the electronic device.

Because an area of the first display subarea is greater than an area of the second display subarea, the first display subarea is used to display a picture, for example, display a movie or a web page. Therefore, user experience can be improved.

For another example, in an implementation, in the half-unfolded state, the controlling the first display subarea and/or the second display to display a picture based on the status of the electronic device includes:

controlling the first display subarea and the second display subarea to simultaneously display a picture based on the status of the electronic device.

Specifically, when two users are opposite and the electronic device is placed between the two users, the processing module may control both the two display subareas to display a picture. Therefore, both the two users can view content displayed in respective corresponding display subareas. Therefore, in this embodiment of this application, one machine can be used by two users, and user experience can be improved.

Specifically, in the half-unfolded state, when the processing module controls the first display subarea and the second display subarea to simultaneously display a picture, the two display subareas may display same content. For example, both the two display subareas may display a same movie picture. Optionally, the two display subareas may alternatively display different content. For example, when the two users use different applications, one display subarea displays a picture of one application, and the other display displays a picture of another application. This is not limited in this embodiment of this application. Therefore, in this embodiment of this application, one machine can be used by two users, and user experience can be improved.

For example, the user uses the electronic device. When the electronic device is in the folded state, the first display subarea faces upwards, and the first display subarea displays a picture taken by a camera (in this case, the camera is used as a rear-facing camera in the first display subarea), after the user flips the electronic device, the second display subarea faces upwards, after obtaining this state, the processing module may switch the displayed picture from the first display subarea to the second display subarea, in other words, display a selfie of the user by using the second display subarea (in this case, the camera is used as the rear-facing camera in the first display subarea).

The foregoing describes a specific case in which the processing module is configured to control the first display subarea and/or the second display to display a picture based on the status of the electronic device.

Alternatively, in actual application, the processing module may alternatively select, according to an instruction entered by the user, the first display subarea and/or the second display subarea to display a picture. This embodiment of this application is not limited thereto. For example, when the electronic device is in the folded state, and the first display subarea displays a picture taken by a camera (in this case, the camera is used as a rear-facing camera in the first display subarea), after the user taps a switching button (for example, a button for switching the camera or switching a displayed picture) displayed in the first display subarea, after obtaining an instruction of the user, the processing module may switch the displayed picture from the first display subarea to the second display subarea. In addition, the user flips the electronic device to display a selfie displayed in the second display subarea (in this case, the camera is used as the rear-facing camera in the first display subarea).

Therefore, in this embodiment of this application, the at least one camera of the electronic device may be used as the rear-facing camera in the first display subarea, or may be used as a front-facing camera in the second display subarea. In other words, the at least one camera in this embodiment of this application may be used as the rear-facing camera, or may be used as the front-facing camera to take a selfie. In this embodiment of this application, the at least one camera disposed on the rear of the first display subarea may have two uses, that is, may be used as the rear-facing camera or may be used as the front-facing camera. Therefore, in this embodiment of this application, the front-facing camera may not need to be separately disposed. Therefore, in this embodiment of this application, the selfie function can be supported when no camera is disposed on the front of the display. Because no camera is disposed on the front of the display, the electronic device in this application may also have a relatively high screen-to-body ratio to meet a requirement of the user for a bezel-less screen.

In a possible implementation, as shown in FIG. 7A and FIG. 7B, a length of a folding rotating shaft of an electronic device 200 matches a length of a long side of the electronic device 200, so that the electronic device 200 uses the folding rotating shaft, to fold a short side part into two parts: an upper part and a lower part. That the length of the folding rotating shaft of the electronic device 200 matches the length of the long side of the electronic device 200 may be that the length of the folding rotating shaft is the same as or close to the length value of the long side. Alternatively, it is understood that a length value of the folding rotating shaft is closer to a length value of the long side. Alternatively, in an implementation, as shown in FIG. 5, a length of a folding rotating shaft of an electronic device 200 is not less than a width of a folded mobile phone. In this case, lengths that are of a long side and a short side of the electronic device 200 when the electronic device 200 is in an unfolded state may be close to each other, or may differ greatly.

Figure 11:
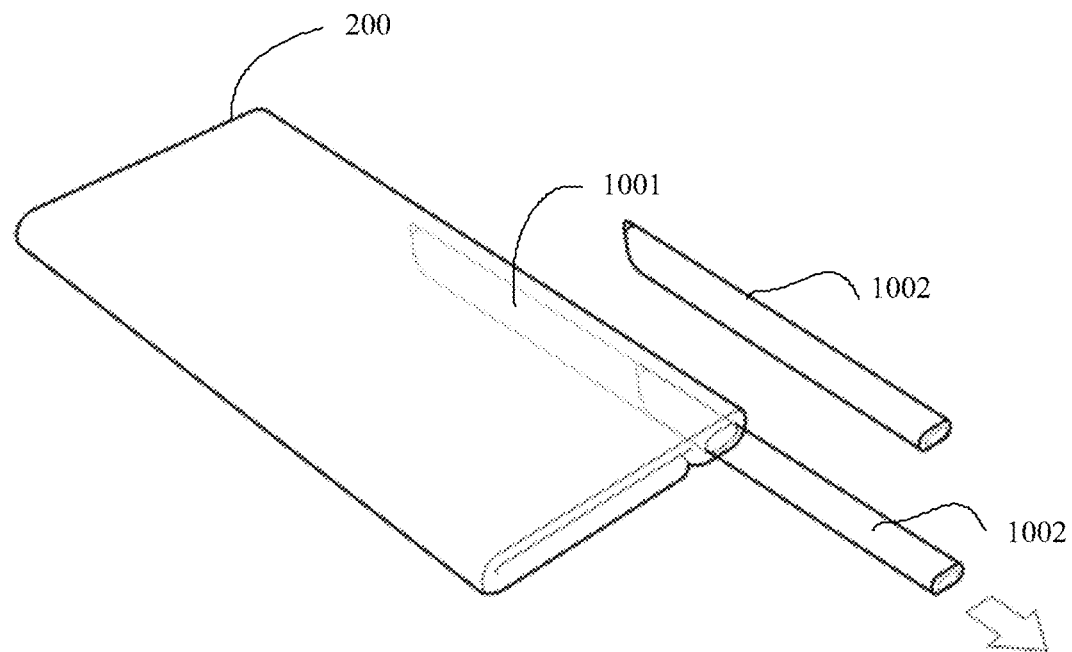
FIG. 11 is a schematic structural diagram of an electronic device according to an embodiment of this application.
Figure 12:
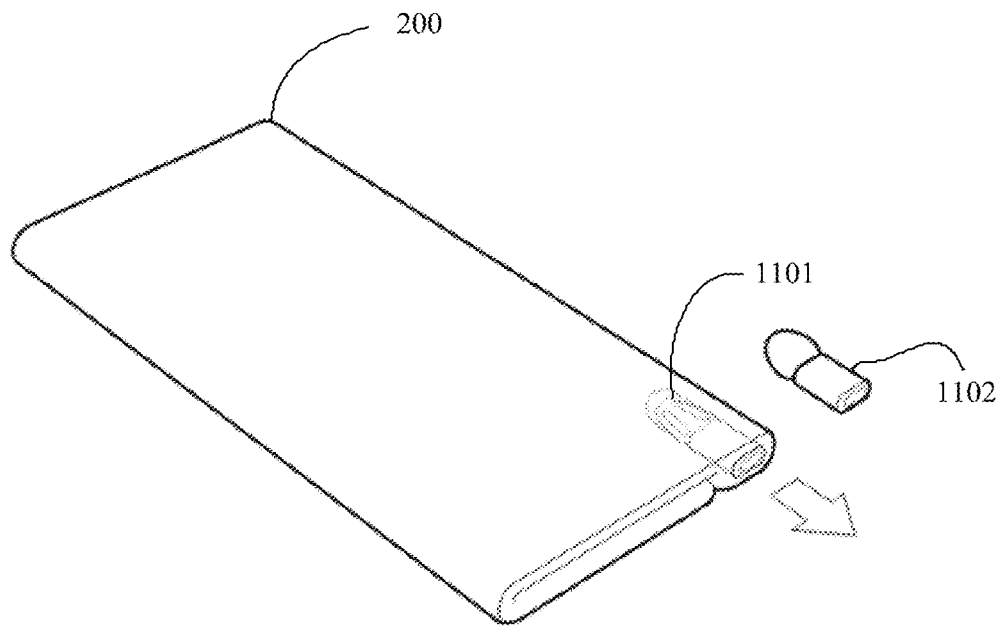
FIG. 12 is another schematic structural diagram of an electronic device according to an embodiment of this application.

In a possible implementation, the electronic device 200 may be further provided with an accommodating groove, configured to accommodate an accessory. For example, as shown in FIG. 11, a protrusion part (an area whose thickness is a second thickness value, or an area corresponding to a first rear subarea 213) on the rear of a first display subarea 211 of an electronic device 200 may include an accommodating groove 1001, and the accommodating groove 1001 may be used to accommodate a stylus 1002. When the user uses the stylus 1002, the stylus 1002 may be taken out from the accommodating groove 1001, and may be pushed into the accommodating groove 1001 after the user finishes using the stylus 1002. The stylus 1002 may be a touch stylus. Optionally, as shown in FIG. 12, another component may be placed in the area whose thickness is the second thickness value on the rear of a first display subarea 211 of an electronic device 200. For example, a handwriting tool in a form different from that in FIG. 11, or another accessory such as a wireless headset is placed in the area whose thickness is the second thickness value. Optionally, a thickness of the accommodating groove and a thickness of a corresponding accessory may be greater than a first thickness value.

In a possible implementation, another component may be integrated into/placed on the protrusion part on the rear of the first display subarea 211 of the electronic device 200. The protruding part on the rear of the first display subarea 211 of the electronic device 200 has relatively large space. In addition to a camera, for example, one, two, three, four, or more cameras, other components such as a flash, an antenna, a button, or a microphone may be placed. The button may include a power button or a volume button, or may include another button. The button may be disposed in the first rear subarea 213, or may be disposed on a side edge of the protruding part. The antenna may include an antenna for receiving and sending a mobile communications network signal, or may include an antenna for a short-range communications network, such as WiFi, NFC, near field communication (near field communication), or Bluetooth.

In a possible implementation, another component whose thickness is higher than the first thickness value may be integrated into/placed on the protrusion part on the rear of the first display subarea 211 of the electronic device 200, to reduce/avoid another protrusion part. For example, all devices whose thickness values are greater than the first thickness value may be integrated into the protrusion part on the rear of the first display subarea 211 of the electronic device 200.

"One embodiment" or "an embodiment" mentioned throughout this specification does not mean that particular features, structures, or characteristics related to the embodiment are included in at least one embodiment of the present invention. Therefore, "in one embodiment" or "in an embodiment" appearing throughout the specification does not refer to a same embodiment. In addition, these particular features, structures, or characteristics may be combined in one or more embodiments by using any appropriate manner.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
   a foldable display including a first display portion and a second display portion;
   a shaft disposed between the first display portion and the second display portion, the first display portion and the second display portion being configured to rotate about the shaft with respect to each other to fold or unfold the foldable display; and
   at least one camera disposed in a sub-area of the first display portion, the sub-area of the first display portion having a thickness equal to a thickness of the electronic device when the foldable display is folded.

2. The electronic device according to claim 1, wherein the at least one camera is disposed on a rear side of the sub-area of the first display portion, and
   when the foldable display is unfolded, the at least one camera is a rear-facing camera.

3. The electronic device according to claim 1, wherein the at least one camera is disposed on a front side of the sub-area of the first display portion, and
   when the foldable display is unfolded, the at least one camera is a front-facing camera.

4. The electronic device according to claim 1, when the foldable display is unfolded, a ratio of an area of an entire display area of the foldable display to an area of a first end face of the electronic device on which the foldable display is disposed is greater than a first screen-to-body ratio, and the entire display area of the foldable display comprises the first display portion and the second display portion.

5. The electronic device according to claim 1, wherein when the foldable display is folded, a ratio of an area of the first display portion to an area of a second end face of the electronic device on which the first display portion is located is greater than a second screen-to-body ratio.

6. The electronic device according to claim 1, wherein:
   an area of the first display portion is greater than an area of the second display portion;
   when the foldable display is folded, the at least one camera is located in a first rear subarea of the first display portion; and
   the rear of the first display portion comprises the first rear subarea and a second rear subarea, wherein the first rear subarea comprises an area that is on the rear of the first display portion and that does not overlap the rear of the second display portion, and the second rear subarea comprises an area that is on the rear of the first display portion and that overlaps the rear of the second display portion.

7. The electronic device according to claim 6, wherein
   a body thickness corresponding to the second rear subarea of the first display portion and a body thickness corresponding to the second display portion each have a first thickness value,
   a body thickness corresponding to the first rear subarea of the first display portion has a second thickness value, and
   the second thickness value is greater than or equal to the first thickness value.

8. The electronic device according to claim 7, wherein the second thickness value is twice the first thickness value.

9. The electronic device according to claim 6, wherein
   the first rear subarea comprises a first area and a second area, and the at least one camera is disposed in the first area;
   a body thickness that is of the electronic device and that corresponds to the second area, a body thickness that is of the electronic device and that corresponds to the second rear subarea, and a body thickness that is of the electronic device and that corresponds to the second display portion each are a third thickness value; and
   a body thickness that is of the electronic device and that corresponds to the first area is a fourth thickness value, and the fourth thickness value is greater than or equal to the third thickness value.

10. The electronic device according to claim 1, wherein:
    the shaft is further configured to hold the foldable display in a half-unfolded state,
    when the foldable display is in the half-unfolded state, a first side edge of the first display portion and a second side edge of the second display portion are configured to provide support to the electronic device, and
    the first side edge and the second side edge are two separate side edges.

11. The electronic device according to claim 1, further comprising:
    a detection module configured to detect folding and unfolding of the foldable display, and a spatial relationship between the first display portion and the second display portion; and a processing module, configured to control at least one of the first display portion and the second display portion to display a picture based on the folding or unfolding of the foldable display.

12. The electronic device according to claim 11, wherein when the foldable display is folded, the first display portion is front facing, the second display portion is rear facing, and the processing module is configured to control the first display portion to display the picture.

13. The electronic device according to claim 11, wherein when the foldable display is folded, the second display portion is front facing, the first display portion is rear facing, and the processing module is configured to control the second display portion to display the picture.

14. The electronic device according to claim 11, wherein when the foldable display is unfolded, the processing module is configured to control the first display portion and the second display portion together to display the picture.

15. The electronic device according to claim 1, wherein a length of the shaft is less than or equal to a long side of the electronic device and smaller than or equal to a width of the electronic device when the foldable display is folded.

16. The electronic device according to claim 6, wherein the first rear subarea of the first display portion comprises a groove configured to accommodate an accessory.

17. The electronic device according to claim 16, wherein the accessory is a stylus or an earphone.

18. The electronic device according to claim 6, wherein the first rear subarea of the first display portion comprises at least one of a group of an antenna, a flash, a microphone, and a button.

19. A mobile terminal comprising:
a flexible display;
a first body portion and a second body portion coupled through at least the flexible display disposed on the first body portion and the second body portion, the flexible display including a first display subarea attached to a first side of the first body portion and a second display subarea attached to a first side of the second body portion;
a shaft disposed between the first body portion and the second body portion, wherein the first body portion and the second body portion are mounted to the shaft and configured to rotate about the shaft to fold and unfold the flexible display; and
a camera disposed in the first body portion,
wherein the first body portion includes a first sub-portion and a second sub-portion, the first sub-portion of the first body portion has a first body thickness, the second sub-portion of the first body portion has a second body thickness, and the first body thickness is greater than the second body thickness, and
wherein the first sub-portion of the first body portion does not overlap with the second body potion while the flexible display is folded.

20. An electronic device comprising:
a foldable display including a first display portion and a second display portion;
a shaft disposed between the first display portion and the second display portion, the first display portion and the second display portion being configured to rotate about the shaft with respect to each other to fold or unfold the foldable display; and
at least one camera disposed in a sub-area of the first display portion, the sub-area of the first display portion having a thickness greater than a thickness of the electronic device when the foldable display is unfolded,
wherein the sub-area of the first display portion does not overlap with the second display portion while the foldable display is folded.

* * * * *

UNITED STATES PATENT AND TRADEMARK OFFICE
CERTIFICATE OF CORRECTION

| | | |
|---|---|---|
| PATENT NO. | : 11,516,325 B2 | Page 1 of 1 |
| APPLICATION NO. | : 16/982442 | |
| DATED | : November 29, 2022 | |
| INVENTOR(S) | : Liao et al. | |

It is certified that error appears in the above-identified patent and that said Letters Patent is hereby corrected as shown below:

In the Claims

Claim 15: Column 29, Line 21: "electronic device and smaller than or equal to a width of the" should read -- electronic device and is smaller than or equal to a width of the --.

Signed and Sealed this
Twenty-fifth Day of April, 2023

Katherine Kelly Vidal
*Director of the United States Patent and Trademark Office*